United States Patent
Mishra et al.

(10) Patent No.: US 9,971,666 B2
(45) Date of Patent: May 15, 2018

(54) TECHNIQUE OF LINK STATE DETECTION AND WAKEUP IN POWER STATE OBLIVIOUS INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US); James Lionel Panian, San Marcos, CA (US); George Alan Wiley, San Diego, CA (US); Amit Gil, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 15/060,221

(22) Filed: Mar. 3, 2016

(65) Prior Publication Data

US 2016/0259702 A1    Sep. 8, 2016

Related U.S. Application Data

(60) Provisional application No. 62/129,697, filed on Mar. 6, 2015, provisional application No. 62/302,141, filed on Mar. 1, 2016.

(51) Int. Cl.
*G06F 3/00* (2006.01)
*G06F 11/00* (2006.01)
(Continued)

(52) U.S. Cl.
CPC ........ *G06F 11/3051* (2013.01); *G06F 1/3209* (2013.01); *G06F 1/3278* (2013.01);
(Continued)

(58) Field of Classification Search
CPC . H04L 69/16; H04L 29/1232; H04L 43/0864; G06F 1/3209; G06F 11/3051; G06F 15/17; G06F 1/3278; G06F 9/4418
(Continued)

(56) References Cited

U.S. PATENT DOCUMENTS

| | | |
|---|---|---|
| 5,600,656 A | 2/1997 | Kelsey et al. |
| 5,944,803 A | 8/1999 | Whitehouse |

(Continued)

FOREIGN PATENT DOCUMENTS

| | | |
|---|---|---|
| CN | 101287221 A | 10/2008 |
| CN | 103888873 A | 6/2014 |

(Continued)

OTHER PUBLICATIONS

International Search Report and Written Opinion—PCT/US2016/021047—ISA/EPO—dated May 25, 2016.

(Continued)

*Primary Examiner* — Faisal M Zaman
(74) *Attorney, Agent, or Firm* — Loza & Loza LLP

(57) ABSTRACT

System, methods, and apparatuses are described that facilitate a first device to transmit/retransmit a message to a second device. The first device transmits a first message to the second device. The first device then receives a second message and identifies a bit of the second message indicating an originator of the second message. If the bit indicates the first device as the originator of the second message, then the second message is an echo of the first message. Reception of the echo indicates that the second device is in a sleep state. Accordingly, the first device waits for the second device to wake and retransmits the first message to the second device to ensure that any packets lost during the original transmission of the first message (when the second (Continued)

device was asleep) are now retransmitted while the second device is known to be awake.

25 Claims, 24 Drawing Sheets

(51) Int. Cl.
  *G06F 11/30* (2006.01)
  *G06F 9/44* (2018.01)
  *G06F 15/78* (2006.01)
  *G06F 1/32* (2006.01)
  *G06F 15/17* (2006.01)

(52) U.S. Cl.
  CPC ........ *G06F 9/4418* (2013.01); *G06F 11/3041* (2013.01); *G06F 15/17* (2013.01); *G06F 15/7807* (2013.01); *Y02D 10/157* (2018.01)

(58) Field of Classification Search
  USPC ............ 710/16; 714/748; 370/252, 248, 389
  See application file for complete search history.

(56) References Cited

U.S. PATENT DOCUMENTS

| | | | |
|---|---|---|---|
| 6,020,760 A | 2/2000 | Sample et al. | |
| 9,092,393 B2 | 7/2015 | Whitefield et al. | |
| 9,660,896 B2* | 5/2017 | St-Laurent | H04L 43/50 |
| 9,906,421 B2* | 2/2018 | Ikegami | H04L 43/0811 |
| 2003/0123448 A1* | 7/2003 | Chang | G06F 9/54 370/395.1 |
| 2004/0130361 A1 | 7/2004 | Ruat et al. | |
| 2004/0218556 A1* | 11/2004 | Son | H04W 52/0225 370/311 |
| 2005/0076140 A1* | 4/2005 | Fung | H04L 12/4625 709/245 |
| 2006/0072460 A1* | 4/2006 | Fukui | H04L 12/2854 370/235 |
| 2006/0285499 A1* | 12/2006 | Tzeng | H04L 45/00 370/249 |
| 2006/0291385 A1* | 12/2006 | Yang | H04L 43/50 370/229 |
| 2007/0230484 A1 | 10/2007 | Hu et al. | |
| 2008/0095047 A1* | 4/2008 | Skalecki | H04L 41/0668 370/225 |
| 2010/0241880 A1 | 9/2010 | Wertheimer et al. | |
| 2011/0134760 A1* | 6/2011 | Kamachi | H04L 12/437 370/242 |
| 2013/0003601 A1* | 1/2013 | Gupta | H04L 12/462 370/254 |
| 2014/0108679 A1 | 4/2014 | Mishra et al. | |
| 2014/0204768 A1* | 7/2014 | Chen | H04L 43/50 370/244 |
| 2014/0211638 A1* | 7/2014 | Huang | H04W 24/06 370/249 |
| 2014/0355421 A1* | 12/2014 | Zhang | H04L 49/70 370/225 |
| 2015/0092539 A1* | 4/2015 | Sivabalan | H04L 45/28 370/225 |
| 2015/0301979 A1 | 10/2015 | Mishra et al. | |
| 2016/0259624 A1 | 9/2016 | Mishra et al. | |

FOREIGN PATENT DOCUMENTS

| | | |
|---|---|---|
| DE | 10340806 B3 | 5/2005 |
| EP | 2330514 A1 | 6/2011 |
| JP | 2003143044 A | 5/2003 |
| WO | WO-2014062661 A1 | 4/2014 |
| WO | WO-2016040884 A1 | 3/2016 |

OTHER PUBLICATIONS

Bader E., How to get 4 UART on a MSP430? MSP Low-Power Microcontroller Forum—MSP Low-Power Microcontrollers—TI E2E Community, Retrieved dated on Feb. 17, 2016, Retrieved from the Internet URL: http://e2e.ti.com/support/microcontrollers/msp430/f/166/08748/135631 , 7 Pages.

* cited by examiner

TECHNIQUE OF LINK STATE DETECTION AND WAKEUP IN POWER STATE OBLIVIOUS INTERFACE

CROSS-REFERENCE TO RELATED APPLICATIONS

This application claims priority to and the benefit of U.S. Provisional Application Ser. No. 62/129,697, entitled "IMPEDANCE-BASED FLOW CONTROL FOR A TWO-WIRE INTERFACE SYSTEM WITH VARIABLE FRAME LENGTH" filed on Mar. 6, 2015, and U.S. Provisional Application Ser. No. 62/302,141, entitled "TECHNIQUE OF LINK STATE DETECTION AND WAKEUP IN POWER STATE OBLIVIOUS INTERFACE," filed on Mar. 1, 2016, the entire contents of which are incorporated herein by reference.

BACKGROUND

Field

The present disclosure relates generally to integrated circuit interfaces, and more particularly, to systems and methods for transmitting a signal to a device via a two-wire integrated circuit interface based on a determined power state of the device.

Background

General purpose input/output (GPIO) enables an integrated circuit designer to provide generic pins that may be customized for particular applications. For example, a GPIO pin is programmable to be either an output or an input pin depending upon a user's needs, A GPIO module or peripheral device will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIOs (one GPIO to transmit a given signal and one GPIO to receive that signal). For example, a symmetric IPC interface between a modem processor and an applications processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions are then violated.

To alleviate the pin demands suffered by conventional GPIO systems, a "virtual" GPIO architecture has been developed such in which multiple GPIO signals are serialized onto a single transmit pin such as through a finite state machine (FSM). The FSM receives the multiple GPIO signals from a GPIO interface that in turn receives the multiple GPIO signals from a processor. The GPIO interface also interfaces with conventional GPIO pins that transmit conventional GPIO signals. The distinction between the conventional GPIO signals and the virtual GPIO signals carried on the transmit pin is transparent to the processor. This is quite advantageous in that the processor needs no software modification to communicate through the GPIO interface. With regard to transmission, the processor thus presents a set of GPIO signals to the GPIO interface. Depending upon the number of conventional GPIO pins available, the GPIO interface will transmit a first subset of the GPIO signals over corresponding conventional GPIO pins. The GPIO interface then presents a remaining subset of the GPIO signals to the FSM, which serializes the remaining GPIO signals and transmits them over the dedicated transmit pin.

During GPIO signal transmission, the dedicated transmit pin couples through a suitable transmission line, such as a circuit board trace, to a receiving integrated circuit's dedicated receive pin. A transmitting integrated circuit thus also includes a dedicated receive pin for receiving transmitted virtual GPIO signals from a remote integrated circuit. The FSM deserializes the received virtual GPIO signals into a first set of received GPIO signals that are presented to the GPIO interface. Similarly, the GPIO interface receives a second set of received GPIO signals through the conventional GPIO pins. The first and second set of received GPIO signals may then be presented to the processor in a conventional fashion through the GPIO interface. To the processor, it is thus transparent whether a given received GPIO signal was received on the dedicated receive pin as a virtual GPIO signal or over a conventional GPIO pin. The processor thus needs no software modification with regard to transmission or reception.

Regarding virtual GPIO capability, note that a receiving circuit may not be ready to receive a frame of virtual GPIO signals (nor to receive conventional GPIO signals). Flow control allows such a receiving integrated circuit to indicate to the transmitting integrated circuit whether or not the receiving integrated circuit is able to currently receive data. In general, however, flow control requires the use of additional pins. For example, a universal asynchronous receiver transmitter (UART) interface includes a request to send (RTS) pin as well as a clear to send (CTS) pin. These two flow control pins are in addition to a dedicated receive pin and a dedicated transmit pin. The two additional flow control pins (RTS and CTS) for a UART interface thus increases pin count and contributes to higher manufacturing cost.

Accordingly, there is a need in the art for a GPIO architecture that can transmit and receive a plurality of GPIO signals using just a two-pin interface in which the flow control is multiplexed over the two-pin interface. More generally, there is a need in the art for multiplexed flow control for two-pin interfaces.

Furthermore, devices that are interconnected by a common physical interface may have the need to transition between different power states. However, an idle state of the physical interface prevents one connected device from learning a power state of another connected device. For example, when the physical interface is in the idle state, the physical interface may not indicate the power state (active/nonactive) of a receiving device to a transmitting device. Hence, a packet transmitted from the transmitting device is very likely to be lost if the transmission occurs during a sleep state of the receiving device. Current solutions for handling such power state "blindness" or "obliviousness" involves additional side-band signaling or additional protocol operations. However, such solutions are inefficient as they require additional hardware pins or add unwanted latency. Accordingly, there is a need for a method and/or apparatus that optimally resolves problems associated with power state blindness/obliviousness of devices interconnected by a com-

SUMMARY

Aspects disclosed herein provide systems, methods, and apparatus for transmitting a signal/packet/message to a device based on a determined power state of the device.

In an aspect of the disclosure, a method of a first device for transmitting a message includes transmitting a first message to a second device. In an aspect, the transmission of the first message to the second device triggers a wakeup operation at the second device when the first message is detected at the second device during a sleep state of the second device. The method further includes receiving a second message, determining whether the second message is an echo of the first message, determining that the second device is in a sleep state when the second message is the echo of the first message, and retransmitting the first message to the second device when the second message is the echo of the first message.

In an aspect of the disclosure, the determining whether the second message is the echo of the first message includes identifying a bit of the second message indicating an originator of the second message, determining that the second message is the echo when the bit indicates the first device as the originator of the second message and determining that the second message is not the echo when the bit indicates the second device as the originator of the second message.

In an aspect of the disclosure, the retransmitting the first message includes waiting a pre-defined amount of time for the second device to wake up after determining that the second message is the echo, and retransmitting the first message to the second device after the pre-defined amount of time has elapsed.

In another aspect of the disclosure, the retransmitting the first message includes waiting to receive a wakeup indication from the second device after determining that the second message is the echo, and retransmitting the first message to the second device after receiving the wakeup indication. In a further aspect, the retransmitting the first message includes retransmitting the first message to the second device when the wakeup indication is not received after a maximum wait time has elapsed.

In another aspect of the disclosure, a first device for transmitting a message includes a memory and a processing circuit coupled to the memory. The processing circuit is configured to transmit a first message to a second device, receive a second message, determine whether the second message is an echo of the first message, determine that the second device is in a sleep state when the second message is the echo of the first message, and retransmit the first message to the second device when the second message is the echo of the first message.

In a further aspect of the disclosure, a first device for transmitting a message includes means for transmitting a first message to a second device, means for receiving a second message, means for determining whether the second message is an echo of the first message, means for determining that the second device is in a sleep state when the second message is the echo of the first message, and means for retransmitting the first message to the second device when the second message is the echo of the first message.

In an aspect of the disclosure, a processor-readable storage medium having one or more instructions which, when executed by a processing circuit of a first device, cause the processing circuit to transmit a first message to a second device, receive a second message, determine whether the second message is an echo of the first message, determine that the second device is in a sleep state when the second message is the echo of the first message, and retransmit the first message to the second device when the second message is the echo of the first message.

Further aspects disclosed herein provide systems, methods, and apparatus for detecting a signal/packet/message during a sleep state of a receiving device.

In an aspect of the disclosure, a method of a receiving device for detecting a message during a sleep state includes enabling a loopback switch when the receiving device enters a sleep state, detecting a first message from a transmitting device during the sleep state, performing a wakeup operation based on the detected first message, transmitting a second message to the transmitting device via the enabled loopback switch, wherein the second message is an echo of the first message, and receiving a retransmission of the first message from the transmitting device after wakeup of the receiving device.

In an aspect of the disclosure, the second message includes a bit indicating the transmitting device as an originator of the second message. In a further aspect, the second message is transmitted as the echo of the first message to indicate that the receiving device is in the sleep state.

In another aspect of the disclosure, the wakeup operation includes waking up the receiving device within a pre-defined amount of time after the second message is transmitted. Accordingly, the retransmission of the first message is received after the pre-defined amount of time has elapsed. In a further aspect of the disclosure, the wakeup operation includes transmitting a wakeup indication to the transmitting device after wakeup of the receiving device. Accordingly, the retransmission of the first message is received after the wakeup indication is transmitted.

In another aspect of the disclosure, a receiving device for detecting a message during a sleep state includes a memory and a processing circuit coupled to the memory. The processing circuit is configured to enable a loopback switch when the receiving device enters a sleep state, detect a first message from a transmitting device during the sleep state, perform a wakeup operation based on the detected first message, transmit a second message to the transmitting device via the enabled loopback switch, wherein the second message is an echo of the first message, and receive a retransmission of the first message from the transmitting device after wakeup of the receiving device.

In a further aspect of the disclosure, a receiving device for detecting a message during a sleep state includes means for enabling a loopback switch when the receiving device enters a sleep state, means for detecting a first message from a transmitting device during the sleep state, means for performing a wakeup operation based on the detected first message, means for transmitting a second message to the transmitting device via the enabled loopback switch, wherein the second message is an echo of the first message, and means for receiving a retransmission of the first message from the transmitting device after wakeup of the receiving device.

In an aspect of the disclosure, a processor-readable storage medium having one or more instructions which, when executed by a processing circuit of a receiving device, cause the processing circuit to enable a loopback switch when the receiving device enters a sleep state, detect a first message from a transmitting device during the sleep state, perform a wakeup operation based on the detected first message, transmit a second message to the transmitting device via the enabled loopback switch, wherein the second message is an echo of the first message, and receive a retransmission of the first message from the transmitting device after wakeup of the receiving device.

DETAILED DESCRIPTION

Figure 1:
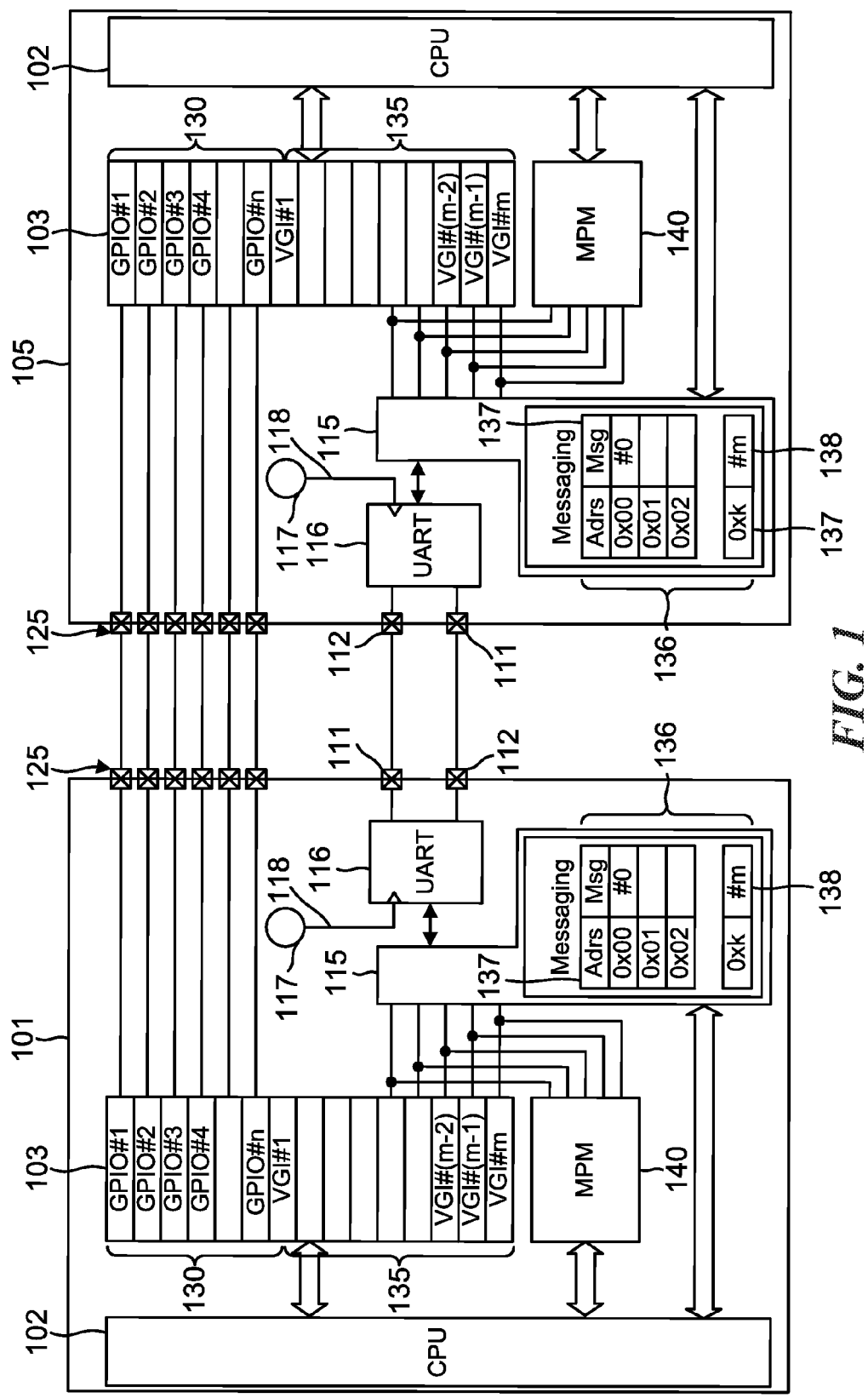
FIG. 1 is a block diagram of an example virtual general purpose input/output interface (VGI) architecture in accordance with an aspect of the disclosure.

Various aspects of the disclosure are now described with reference to the drawings. In the following description, for purposes of explanation, numerous specific details are set forth in order to provide a thorough understanding of one or more aspects. It may be evident, however, that such aspect(s) may be practiced without these specific details.

Overview of Impedance-Based Flow Control for a Two-Wire Interface System with Variable Frame Length In an aspect of the disclosure, a virtual GPIO architecture is provided for communication between two integrated circuits (e.g., two devices) each having a processor. Each integrated circuit also includes a GPIO interface for communicating with a remote processor using a set of signals. This set of signals comprises a set of GPIO signals as well as a set of virtual GPIO signals. Each integrated circuit thus includes a set of GPIO pins corresponding to the set of GPIO signals. These GPIO pins are used to transmit the set of GPIO signals in a conventional manner as known in the GPIO arts. In that regard, a first GPIO signal in the set of GPIO signals is transmitted over a first GPIO pin, second GPIO signal in the set of GPIO signals is transmitted over a second GPIO pin, and so on such that a last GPIO signal in the set of GPIO signals is transmitted over a last GPIO pin.

In contrast to the set of GPIO signals, the set of virtual GPIO signals are transmitted over a dedicated UART transmit pin using a flow control interface that in turn is driven by a virtual GPIO interface finite state machine (VGI FSM). The virtual GPIO interface (VGI) signals for each integrated circuit comprise a transmit set and a receive set. The transmit set is transmitted over the dedicated transmit pin to the remote integrated circuit whereas the receive set is received over a dedicated receive pin from the remote integrated circuit. Note that "device" and "integrated circuit" are deemed herein to be equivalent terms. The VGI FSM in each device is configured to serially transmit the transmit set to the remote processor through a UART interface over the dedicated transmit pin. The UART interface is further configured to serially receive the receive set of VGI signals from the remote processor over the dedicated receive pin and to present the receive set of VGI signals to the VGI FSM.

The following discussion will assume that the flow control is implemented through a UART interface. But it will be appreciated that the flow control techniques discussed herein may be practiced without any UART capability. A UART interface is well-known. In its conventional format, the UART interface includes a transmit pin (TX), a receive pin (RX), a Request to Send (RTS) pin, and a Clear to Send (CTS) pin. The UART interface uses an oversampling clock signal that is typically 16 times a bit rate (each received bit by sixteen samples). The UART transmission is straightforward. To send a binary one, the UART interface drives its TX pin to a power supply voltage VDD for the duration of the bit period as determined by sixteen cycles of its oversampling clock signal. The receiving UART interface samples the resulting received signal on its RX pin using its own oversampling clock. Transmission of a logical zero is the complement of the binary one transmission. The transmitting UART interface grounds its TX pin for the duration of the bit period as determined by its oversampling clock signal cycling sixteen times. In some aspects, both edges of the oversampling clock may be used such that a bit period corresponds to eight cycles of the oversampling clock.

A conventional UART interface uses another pair of pins as a control protocol. In particular, a conventional UART interface indicates that it is ready to receive data by charging a Request to Send (RTS) pin to the power supply voltage. This asserted voltage is then received at the receiving UART interface on its Clear to Send (CTS) pin. Thus, a conventional UART interface transmits when the interface sees its CTS pin voltage asserted. The resulting transmission is in frames of eight bits.

The conventional UART control protocol is modified through the VGI FSM as explained further herein to enable variable-sized frames of virtual GPIO data to be transmitted over the UART interface's TX pin. The UART interface as disclosed herein is configured to weakly pull its TX pin to VDD during idle periods (no data transmission). A beginning of a frame transmission may then be demarcated by the transmitting UART interface pulling its TX pin low for a bit period. Each integrated circuit's processor provides a first set of signals to the GPIO interface. From the GPIO interface, a portion of the first set of signals are transmitted to the remote processor as a first set of GPIO signals over a first set of corresponding GPIO pins. A remaining portion of the first set of signals from the processor is provided by the GPIO interface in parallel to the VGI FSM. The VGI FSM may then serially transmit the remaining portion as a transmit set of VGI signals through the UART interface and over the dedicated transmit pin. The GPIO interface also receives a second set of GPIO signals from the remote processor over a second set of corresponding GPIO pins. Depending upon the mode of operation, the VGI FSM serially receives the receive set of VGI signals or the receive set of messaging signals from the remote processor and provides the receive set in parallel to the GPIO interface.

The UART interface may also transmit UART signals in addition to the VGI signals. The UART signals are representative of what is denoted herein as "messaging" signals to distinguish them from VGI signals. As used herein, messaging signals are signals that to the processor are associated with a corresponding address. In that regard, a conventional GPIO signal is received or transmitted on a corresponding GPIO pin. Thus, a GPIO signal does not require an address since the receiving processor determines the identity of the received GPIO signal through the identity of the corresponding GPIO pin. To identify VGI signals, the VGI FSM assigns each VGI signal to a corresponding bit position in a frame. For example, a frame may comprise eight VGI signals arranged from a first VGI signal to an eighth VGI signal. The receiving VGI FSM thus identifies a given received VGI signal from its bit position in the frame. But messaging signals are not assigned to individual pins like conventional GPIO signals. The processor identifies a messaging signal by writing the messaging signal to a particular register address or receiving the messaging signal from a particular register address. The following discussion will assume that the messaging signals are UART signals but it will be appreciated that other types of messaging signals, such as Inter-integrated Circuit (I2C) signals or improved Inter-Integrated Circuit (I3C) signals, may be used. Within a frame, the messaging signals are identified by their bit position similar to VGI signals, however, the VGI FSM writes the received messaging signals to their appropriate registers rather than presenting them to the GPIO interface. The processor may then retrieve or write to the messaging registers in a conventional fashion.

A number of aspects related to the virtual GPIO signals and the messaging signals for the disclosed virtual GPIO architecture are provided. In one aspect, each frame transmitted over the dedicated transmit pin includes a header that identifies whether the frame comprises a transmit set of VGI signals or a transmit set of messaging signals. The header may also indicate a frame length to be set on the receiver side or indicate an acknowledgement of the desired frame length. In another aspect, the header is extended for a frame that includes both VGI signals and messaging signals such that the extended header identifies the bit positions of the VGI signals and the messaging signals.

To implement flow control, each UART interface includes an RTS control circuit that couples to the receive pin. The RTS control circuit couples the receive pin to ground through two selectable input impedances—a high input impedance and a low input impedance, wherein the high input impedance is greater than the low input impedance. The RTS control circuit applies the flow control during a stop bit that terminates each transmitted frame. If the receiving integrated circuit is not ready for any additional frames, the RTS control circuit of the receiving integrated circuit selects for its low input impedance. Since the transmitting integrated circuit is driving its transmit pin at this time through a relatively large output impedance, the voltage on the transmitting integrated circuit's transmit pin will drop towards ground. The transmitting integrated circuit's UART interface includes a CTS control circuit coupled to its transmit pin to detect the drop in voltage. If the CTS control circuit detects a voltage drop during the transmission of the stop bit, the transmitting integrated circuit will refrain from transmitting further frames until the voltage on its transmit pin recovers. Voltage recovery will only occur when the receiving integrated circuit's RTS control circuit selects for its high input impedance. In this fashion, flow control is achieved over the transmit pin without requiring any separate pins for the RTS and CTS functions.

Exemplary Description of Impedance-Based Flow Control for a Two-Wire Interface System with Variable Frame Length A serial interface is provided that implements a variable frame-length capability as well as an impedance-based flow control over two pins—a transmit pin and a receive pin. The following discussion will be directed to an aspect that uses a UART interface configured for the impedance-based flow control. However, it will be appreciated that any two-pin serial interface may be modified to advantageously include the variable frame length and impedance-based flow control capabilities discussed herein. Thus, the following discussion will be directed to a VGI/UART aspect without loss of generality.

An example virtual general purpose input/output interface (VGI) architecture 100 is shown in FIG. 1. A host integrated circuit (or device) 101 and a peripheral integrated circuit (or device) 105 both include a two-pin interface comprising a transmit (TX) pin 111 and a receive (RX) pin 112. Each TX pin 111 couples to a corresponding RX pin 112 through a suitable transmission line such as a circuit board trace that couples between the host integrated circuit 101 (which may also be denoted as a host device 101) and the peripheral integrated circuit 105 (which may also be denoted as a peripheral device 105).

The host device 101 and the peripheral device 105 each includes a processor (CPU) 102. The processor 102 in the host device 101 couples to a corresponding GPIO interface 103 so it may interface with a set of conventional GPIO pins 125 in a conventional fashion. Similarly, the processor 102 in the peripheral device 105 couples to a corresponding GPIO interface 103 so it may interface with a set of conventional GPIO pins 125. In the host device 101 and the peripheral device 105, a certain portion of the signals from the corresponding processor 102 processed through the corresponding GPIO interface 103 as conventional GPIO signals 130 may be transmitted and received on conventional GPIO pins 125. For illustration clarity, only a portion of conventional GPIO signals 130 are individually labeled, starting from a GPIO signal #1 to a GPIO signal #n. But a remaining portion of the signals processed through GPIO interface 103 from the corresponding processor 102 are not transmitted or received through conventional GPIO pins 125. Instead, the remaining portion includes a plurality of VGI signals 135 that are transmitted and received through a corresponding VGI finite state machine (FSM) 115 using a dedicated transmit pin 111 and a dedicated receive pin 112. Each VGI FSM 115 also interfaces directly with the corresponding processor 102 with regard to receiving and transmitting messaging signals such as UART signals 136. Since UART signals 136 are not GPIO signals, they do not couple through the GPIO interface 103. Each VGI FSM 115 transmits and receives UART signals 136 through its dedicated transmit pin 111 and receive pin 112. These pins are thus "hybrid" pins in that they are used for both VGI signals 135 and UART signals 136. In VGI architecture 100, the transmit and receive set of VGI signals 135 for the host device 101 and the peripheral device 105 includes a plurality of m VGI signals 135, ranging from a VGI signal #1 to a VGI signal #m, where to is a positive integer.

VGI signals 135 do not each have their own dedicated pins as is the case for conventional GPIO signals 130. This is quite advantageous in that VGI architecture 100 achieves a significant reduction of pins as compared to a conventional GPIO implementation wherein in each virtual GPIO signal 135 would each require its own pin. UART signals 136 would conventionally require another dedicated transmit pin and another dedicated receive pin as well. But these additional pins are also eliminated in the advantageous VGI architecture 100 of the present disclosure since the messaging signals are also transmitted over the transmit pin 111 and received over receive pin 112.

Figure 2A:
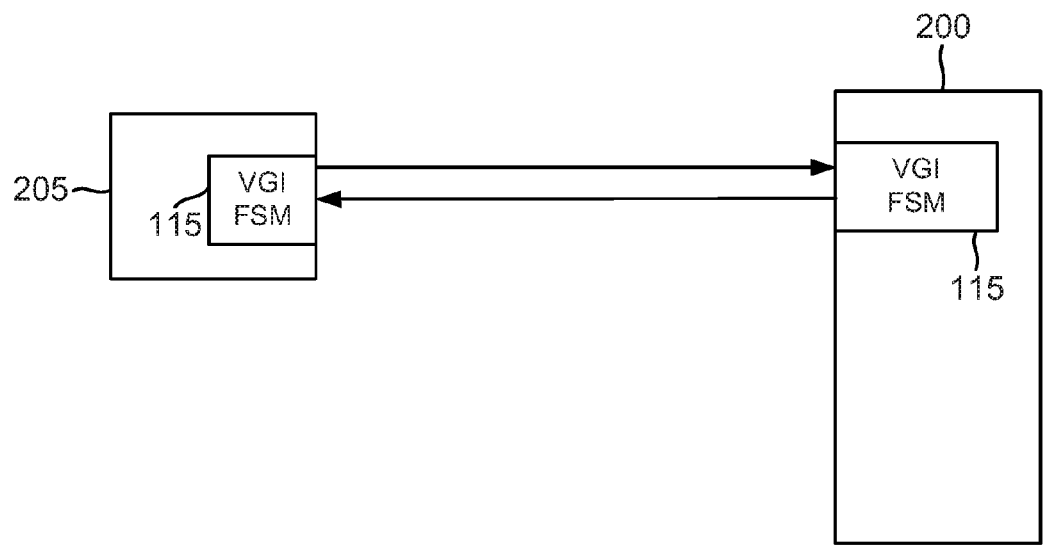
FIG. 2A is a high-level block diagram for a VGI architecture in which a processor communicates with a single remote processor.
Figure 2B:
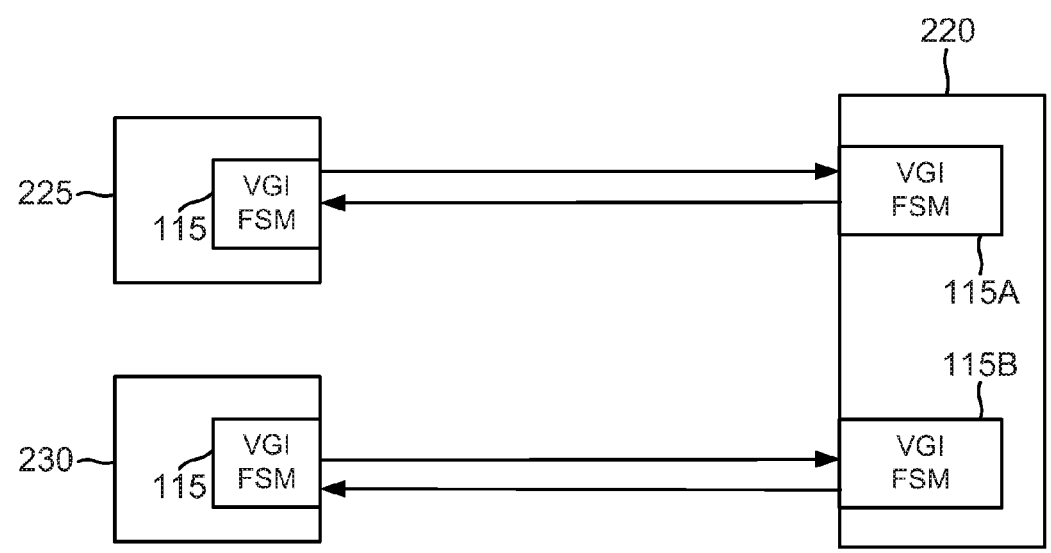
FIG. 2B is a high-level diagram for a VGI architecture in which a processor communicates with two remote processors.

An integrated circuit may include just one VGI FSM 115 or may include a plurality of these elements for interfacing with multiple external systems. FIG. 2A illustrates a VGI architecture in which an integrated circuit 200 includes a single FSM 115 for communicating with a remote processor (not illustrated) in an integrated circuit 205, which includes its own VGI FSM 115. In contrast, an integrated circuit 220 shown in FIG. 2B includes a first VGI FSM 115A and a second VGI FSM 115B for communicating with remote processors (not illustrated) in integrated circuits 225 and 230, respectively. Each integrated circuit 225 and 230 thus includes its own VGI FSM 115. In that regard, a system on a chip (SoC) may be configured with as many VGI FSMs 115 as is necessary to accommodate VGI signaling with a plurality of other devices. Regardless of the number of VGI FSMs 115 a device may have, each VGI FSM 115 communicates using its own dedicated transmit pin 111 and receive pin 112, as discussed with regard to FIG. 1.

Referring again to FIG. 1, because VGI signals 135 are accommodated using a finite state machine such as VGI FSM 115, processors 102 may be asleep or in another type of dormant state yet be able to receive VGI signals 135 and messaging signals 136. In this fashion, the VGI architecture 100 not only advantageously economizes the number of pins for each GPIO interface 103 but also operates at a low power.

As used herein, "pin" is a generic term to cover the structure such as a pad or an actual pin that an integrated circuit uses to couple to leads on a circuit board or other suitable physical interconnects (e.g., package interconnect or through-hole via interconnect). For example, if an integrated circuit has sixteen GPIO pins or pads 125 such as shown in FIG. 1, then these pins could be configured to accommodate eight symmetric GPIO signals 130 or sixteen asymmetric GPIO signals 130. A symmetric GPIO signal 130 is transmitted by both the host device 101 and the peripheral device 105. An asymmetric GPIO signal 130 is one that is transmitted by only one of the host device 101 and the peripheral device 105, in addition, each integrated circuit can accommodate the input/output interfacing of a plurality of m VGI signals 135. Similarly, each integrated circuit can accommodate the input/output interfacing of a plurality of m UART signals 136. With regard to each processor 102, there is no difference between GPIO signals 130 and VGI signals 135—both are treated as ordinary GPIO signals that are transmitted and received as necessary through GPIO interface 103. However, since VGI signals 135 and messaging signals 136 do not have dedicated pins in contrast to conventional GPIO signals 130, VGI signals 135 and messaging signals 136 are serialized in VGI FSMs 115 for transmission on the corresponding transmit pin 111. Upon reception over the receive pin 112, each VGI FSM 115 deserializes the received serialized VGI signals 135 and the received serialized messaging signals 136 (as noted above, the following discussion will consider "messaging signals" and "UART signals" to be synonymous with the proviso that other types of messaging signals 136 may be in alternative aspects, such as I2C or I3C signals). Each VGI FSM 115 thus functions as a serializer/deserializer with regard to VGI signals 135 and UART signals 136.

The processor 102 may need to receive an interrupt signal in response to changes in selected ones of VGI signals 135 or messaging signals 136. With respect to VGI signals 135, a modem power manager (MPM) 140 monitors the selected ones of VGI signals 135 such as programmed through interrupt configuration registers (not illustrated). Each VGI signal 135 has a corresponding interrupt configuration register. Should a VGI signal 135 be required to generate an interrupt in response to the signal changing state, the corresponding configuration register would be programmed accordingly. Similarly, should a VGI signal 135 be one that does not generate an interrupt regardless of whether the signal has changed state, the corresponding interrupt configuration register would also be programmed accordingly. MPM 140 may also comprise a finite state machine. Thus, similar to VGI FSM 115, MPM 140 operates at a low power and is active regardless of whether its processor is in a sleep mode or some other dormant state.

VGI signals 135 may be subdivided into a transmit set and a receive set. In a symmetric system, each transmit set would have the same number. Similarly, each receive set would have the same number of signals. However, it will be appreciated that VGI architecture 100 is advantageous in that it can readily accommodate an asymmetric signaling aspect in which the transmit sets of virtual GPIO signals 135 and UART signals 136 have different sizes in the host device 101 as compared to the peripheral device 105. Similarly, the receive sets for VGI signals 135 and UART signals 136 may also have different sizes in the host device 101 as compared to the peripheral device 105. Regardless of whether the VGI architecture 100 is symmetric or asymmetric, each VGI FSM 115 receives the transmit set of VGI signals 135 in parallel from the GPIO interface 103 in the sense that each signal in the transmit sets is carried on its own lead between the GPIO interface 103 and the VGI FSM 115. UART signals 136 do not couple through the GPIO interface 103. In that regard, each VGI FSM 115 may be given some peripheral address by the corresponding processor 102. Each VGI FSM 115 is configured to decode an address field 137 in UART signals 136 as received from the corresponding processor 102 so that a given UART signal 136 may be stored in a corresponding messaging register 138. The messaging registers 138 may each be mapped to some offset of the general address for the VGI FSM 115 within the address space for the corresponding processor 102. The processor 102 can then access messaging registers 138 to obtain the appropriate UART signals 136. Similar to the VGI signals 135, the UART signals 136 may be subdivided into a transmission set and a receive set. Regardless of whether the architecture is symmetric or asymmetric, the resulting transmission of the transmit sets for UART signals 136 by the VGI FSM 115 takes place over a dedicated transmit pin 111. The transmit set of VGI signals 135 from a transmitting processor 102 becomes the receive set of VGI signals 135 for a receiving processor 102. Similarly, the transmit set of UART signals 136 from a transmitting device becomes the receive set of UART signals 136 for the receiving device. The receiving device's VGI FSM 115 then deserializes the receive set of VGI signals 135 so that they may be presented in parallel to the GPIO interface 103.

After serializing the transmit set for the VGI signals 135, the VGI FSM 115 presents the resulting serialized transmit set to a corresponding UART interface 116. Each UART interface 116 is configured to transmit serial frames over the corresponding transmit pin responsive to cycles of an oversampling clock signal 118 from an oversampling clock source 117. As noted above, it is conventional to use a 16× oversampling frequency for oversampling clock signal 118 such that the UART interface 116 transmits a binary one bit by charging the transmit pin 111 high (e.g., to a power supply voltage) for sixteen samples of oversampling clock signal 118. Similarly, each UART interface 116 transmits a binary zero bit by discharging the transmit pin 111 low (e.g., to ground) for sixteen cycles of oversampling clock signal 118. Each UART interface 116 is also configured to sample a received bit on the receive pin 112 over sixteen cycles of oversampling clock signal 118. Each UART interface 116 is also configured to compare the resulting samples to some threshold (e.g., one-half the power supply voltage used for the binary one bit transmissions) to determine the binary value of the sample. If the majority of the samples are a binary one, each UART interface 116 receives the bit as a binary one. The converse situation of receiving a binary zero bit would correspond to a majority of the samples being zero. Such UART transmission and reception is well known. But what is not conventional is the implementation of flow control over the transmit pin 111 by each UART interface 116 as discussed further herein. Similarly, it is not conventional to use a UART interface 116 to transmit and receive VGI signals 135.

Since VGI signals 135 are transmitted through the corresponding UART interface 116, the transmitted frames of VGI signals 135 may be deemed to be tunneled virtual GPIO signals 135. As discussed earlier, both UART signals 136 and VGI signals 135 are assigned to a corresponding bit position in the transmitted frames so that the receiving VGI FSM 115 can identify them. A transmitting device and a receiving device must thus both use a common frame size so that the bit position in a received frame is intelligible. For example, if a receiving device is configured to receive an eight-bit frame but receives a ten-bit frame, the receiving device would not know the identity of the extra two bits in the ten-bit frame. At power-up, the frame size should have a predefined size for both the host device 101 and the peripheral device 105. But it may be the case that one of the devices desires to use a longer or shorter frame length than the default size used at power-up. In one aspect, the frame size may thus be programmed by a transmitting device to change the frame size expected by a receiving device. For example, the transmitting device may transmit a programming frame that includes a header that identifies the intention of the transmitting device to program or alter the current frame size used by the receiving device.

Figure 3:
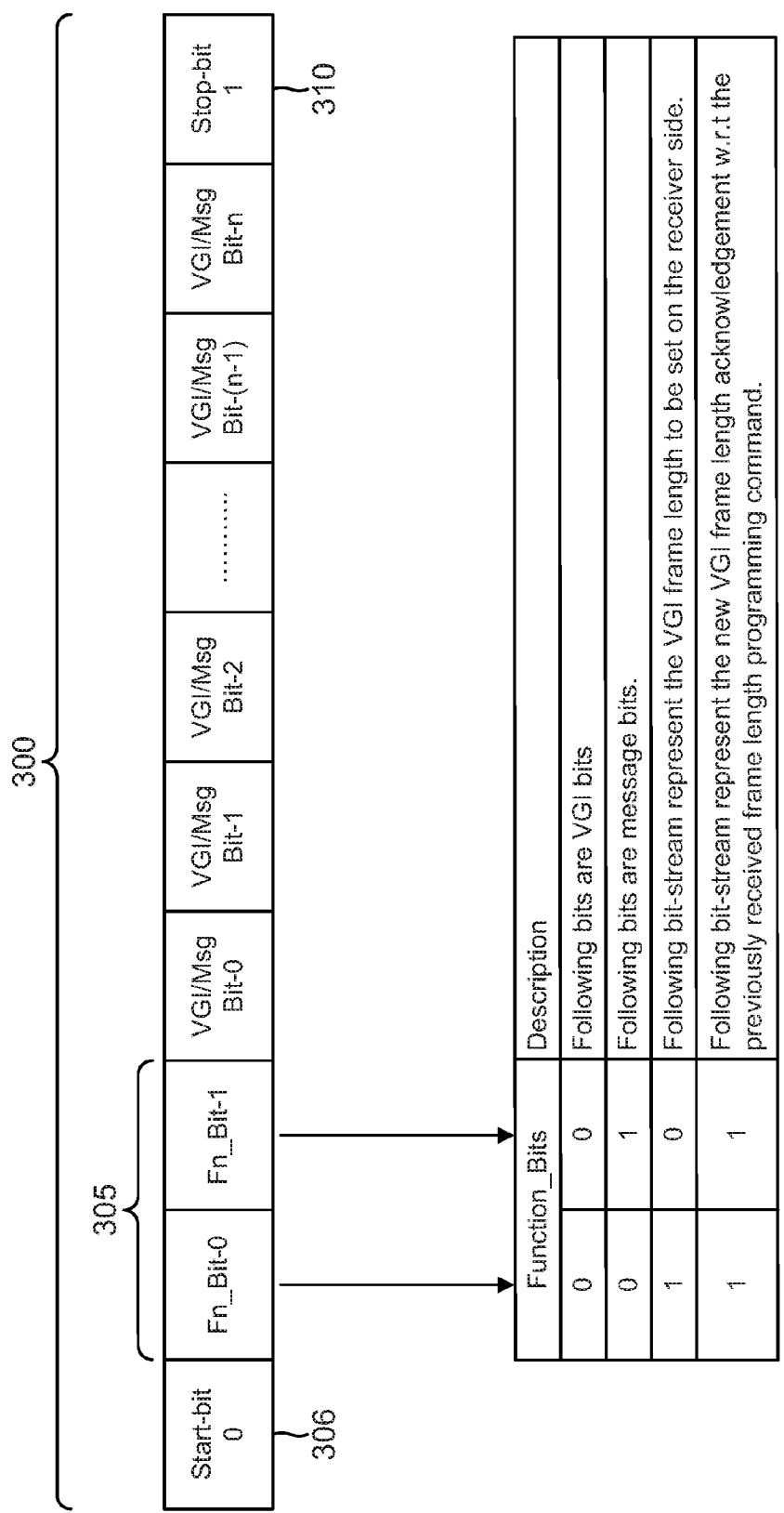
FIG. 3 illustrates an example frame format in accordance with an aspect of the disclosure.

An example frame 300 as configured by a transmitting VGI FSM 115 and corresponding UART interface 116 (FIG. 1) is shown in FIG. 3. Frame 300 begins with a start bit 306 that is discussed further below. A header 305 that follows the start bit 306 may comprise two function bits, fn_0 and fn_1. However, it will be appreciated that alternative aspects may use a greater number of function bits. In one aspect, if both function bits are zero, the following bits in frame 300 are VGI signals 135. If fn_0 is zero and fn_1 equals 1, then the following bits are messaging signals such as UART signals 136. If fn_0 is one and fn_1 equals 0, then the following bits represent the frame length to be expected by the receiving VGI FSM 115. Similarly, if both function bits are one, the following bits represent an acknowledgement by the receiving VGI FSM 115 of the new frame length. If the transmit set of virtual GPIO signals (or the transmit set of messaging signals) is less than this fixed frame size, the unused bits within each frame may be "don't care" values. Alternatively, each FSM 115 may be configured to alter the size of the transmitted frames depending upon the number of bits needed for a given application.

To detect the receipt of a complete frame 300, a receiving UART interface 116 may include a logic circuit (not illustrated) that counts the number of cycles for oversampling clock signal 118 after a receipt of start bit 306. Each bit period corresponds to 16 cycles of oversampling clock signal 118 in one aspect. For example, suppose a receive frame has a body of ten VGI signals 135 that are received responsive to 160 cycles of oversampling clock signal 118. The sampling of header 305 requires 32 samples since it is two bits. After detection of start bit 306 and waiting another 160+32 cycles of oversampling clock, a receiving UART interface 116 would then expect receipt of a stop bit 310. Should stop bit 310 be detected accordingly, modified UART interface 116 may then strobe the corresponding VGI FSM 115 with the frame 300. After latching frame 300 within VGI FSM 115, the corresponding receive set of VGI signals 135 may then be presented to GPIO interface 103. Alternatively, if frame 300 has a body of UART signals 136, VGI FSM 115 writes them to the appropriate messaging registers 138.

A transmit set of VGI signals 135 may thus be transmitted in frame 300. Since the transmit set for a transmitting device becomes the receive set for a receiving device, the receive set is also framed accordingly. This framing is advantageous in that each processor can then monitor the health of the remote processor without needing any additional dedicated pins. For example, each UART interface 116 may be configured to weakly pull its transmit pin 112 (and hence weakly pull the corresponding receive pin 112 for the receiving UART interface 116) to a power supply voltage during a default state (no transmission of frames). Start bit 306 would be a logical zero for such an aspect such that modified UART interface 116 grounds its transmit pin 111 for the appropriate number of cycles of oversampling clock signal 118 (the appropriate number corresponding to the oversampling rate) to transmit start bit 306. In this fashion, each modified UART interface 116 may readily detect receipt of the start bit by detecting that receive pin 112 has been pulled towards ground for the appropriate number of cycles of oversampling clock signal 118. In one aspect, start bit 306 and stop bit 310 are logical complements of each other.

There is the possibility that a receiving device has malfunctioned such that it inappropriately pulls its transmit pin 111 to ground. The receiving UART interface 116 would thus detect this as a start bit 306 and begin counting toward the end of the frame accordingly. But stop bit 310 is a logical one in this aspect such that each modified UART interface 116 charges its transmit pin to the power supply voltage for a bit duration to signal the end of a frame transmission. If a receiving device malfunctions (e.g., its processor crashes) such that a receiving UART interface 116 has detected what is deemed to be a start bit 306, a subsequent stop bit 310 will not be detected so that the receiving VGI FSM 115 may notify its processor 102 of the failure of the transmitting processor 102 accordingly.

Figure 4:
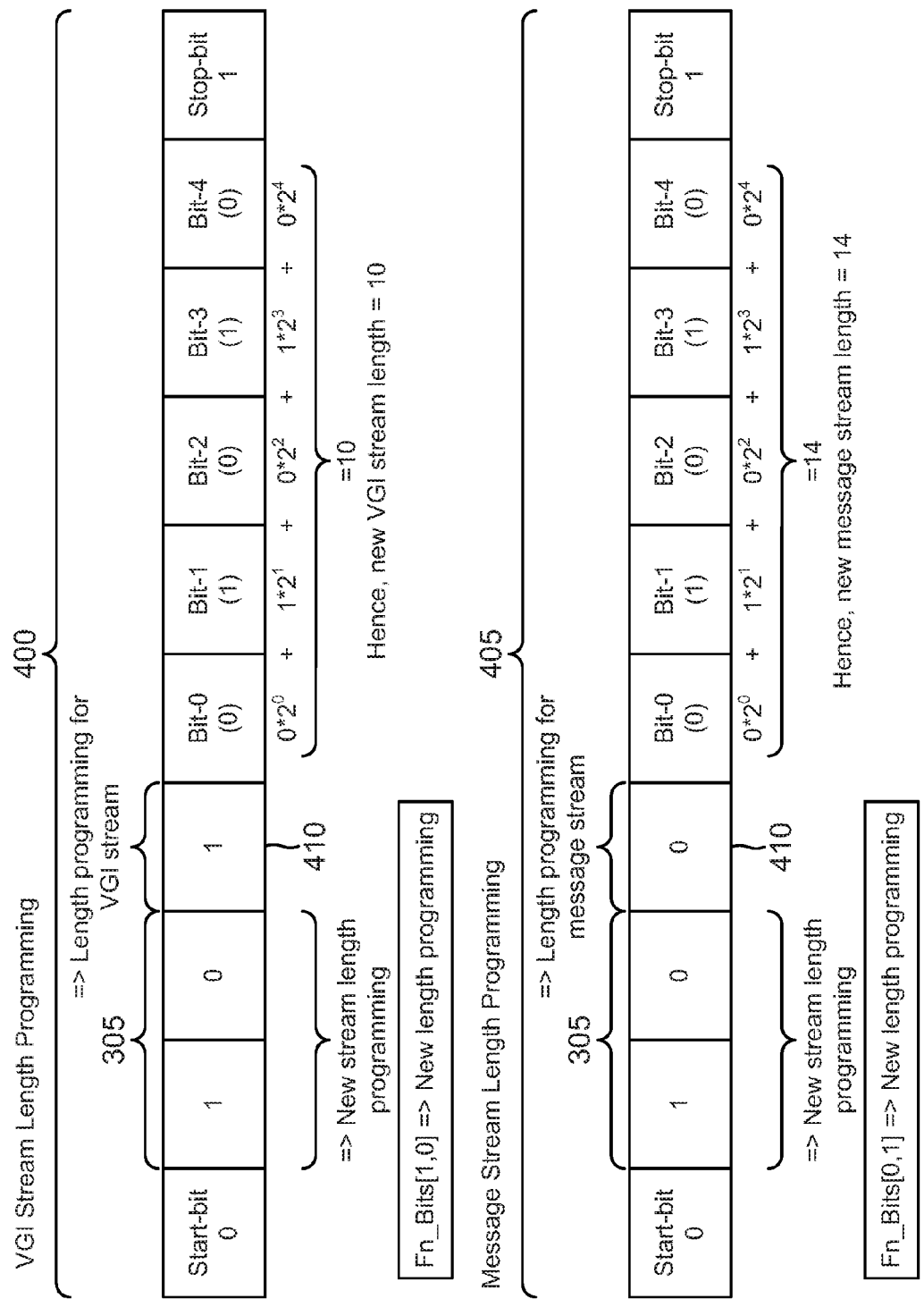
FIG. 4 illustrates length-programming frames used to program the VGI and messaging frame lengths.

Consider the advantages of frame 300—with just the overhead of two function bits 305, a start bit 306, and a stop bit 310, frames of UART signals 136 and VGI signals 135 may be transmitted over just one dedicated transmit pin 111. An example VGI programming frame 400 to set the VGI frame length as well as an example UART programming frame 405 to set the UART frame length are shown in FIG. 4. The frame length is predefined upon power-up. Thus, once a VGI FSM 115 receives a frame with a header 305 indicating that a programming length is being set (such as fn_0 equal 1 and fn_1 equal 0 as discussed previously), then it is known how many programming bits will follow. For example, if the predefined frame length (for the data payload) is eight bits, there will be eight programming bits. In that regard, a receiving VGI FSM 115 needs to know whether the length of a VGI frame or a UART frame is being programmed. Thus, each header 305 in frames 400 and 405 is followed by an identity bit 410. For example, an identity bit 410 equaling one as shown in VGI programming frame 400 may signify that a VGI frame length is being programmed whereas an identity bit 410 equaling zero as shown in UART programming frame 405 may signify that a UART frame length is being programmed. Each programming bit in the programming payload following identity bit 410 represents a binary power of two. The programming bits range from bit 0 (representing 2 to the zeroth power) to a bit 4 that represents 2 to the fourth power. In the VGI programming frame 400, only programming bit 1 and bit 3 are binary ones so the frame length equals the sum of 2 and 8, which equals 10. The VGI frame length expected by the receiving VGI FSM 115 would then be reconfigured from a default value such as 8 bits to 10 bits following reception of the VGI programming frame 400. Similarly, programming bits 1 and 3 are the only binary ones in the UART programming frame 405. Thus, the UART frame length would be changed from the default value to 10 bits following receipt of the UART programming frame 405. Both the VGI programming frame 400 and the UART programming frame 405 begin with a start bit 306 and end with a stop bit 310 as discussed with regard to FIG. 3.

Figure 5:
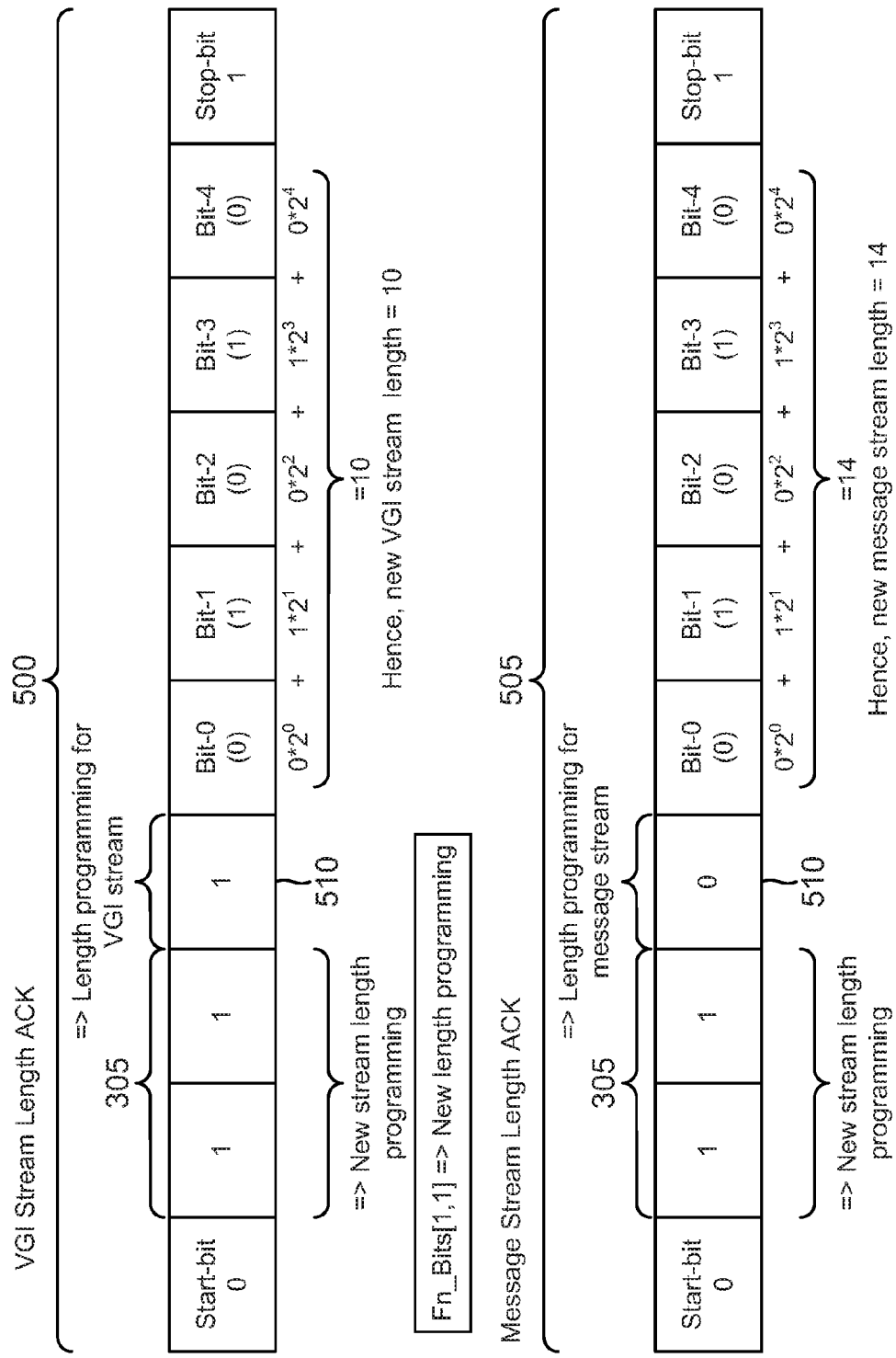
FIG. 5 illustrates acknowledgement frames transmitted to acknowledge the frame lengths programmed in response to the frames of FIG. 4.

Once the frame length has been programmed, the receiving VGI FSM 115 may confirm that it will use the new frame length by transmitting an acknowledgement frame over the transmit pin 111. An example VGI acknowledgement frame 500 and an example UART acknowledgement frame 505 are shown in FIG. 5. The function bits 305 are 1 and 1 as discussed with regard to FIG. 3 to identify that an acknowledgment frame is being transmitted. An identity bit 510 following the header 305 in the VGI acknowledgment frame 500 has a binary one value to identify that the VGI acknowledgment frame 500 acknowledges the setting of a new VGI frame length. The bits in the payload following the identity bit 510 match what was intended to be programmed by the VGI programming frame 400 (FIG. 4). These bits have the same binary weighting as discussed with regard to FIG. 4. The UART acknowledgement frame 505 has its identity bit 510 set to zero to identify itself as a UART acknowledgement frame. Its payload has the same binary weighting as used for the VGI acknowledgment frame 500. The VGI acknowledgement frame 500 and the UART acknowledgement frame 505 both start with a start bit 306 and end with a stop bit 310 as discussed with regard to FIG. 3.

Figure 6:
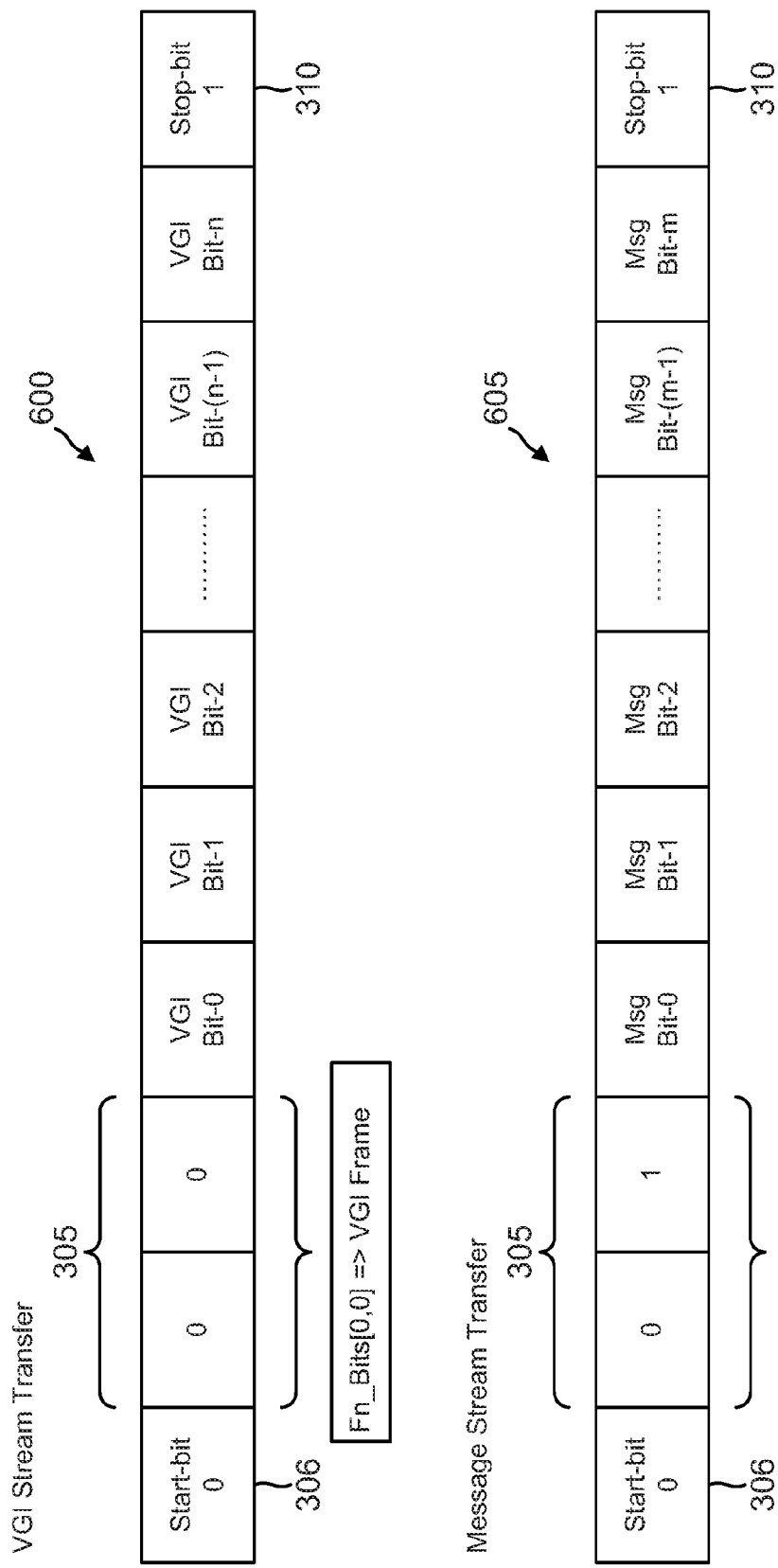
FIG. 6 illustrates an example VGI frame and an example messaging signal frame.

Once the frame lengths are thus programmed, a VGI frame 600 or a UART frame 605 may be transmitted as shown in FIG. 6. The VGI frame 600 is programmed for a payload length (n+1) VGI bits so the VGI bits (which follow function header 305) range from a VGI bit 0 to an nth VGI bit n (n being a positive integer). Without the corresponding serialization over the transmit pin 111, the (n−1) VGI signals 135 would require (n+1) conventional GPIO pins 125.

Figure 7:
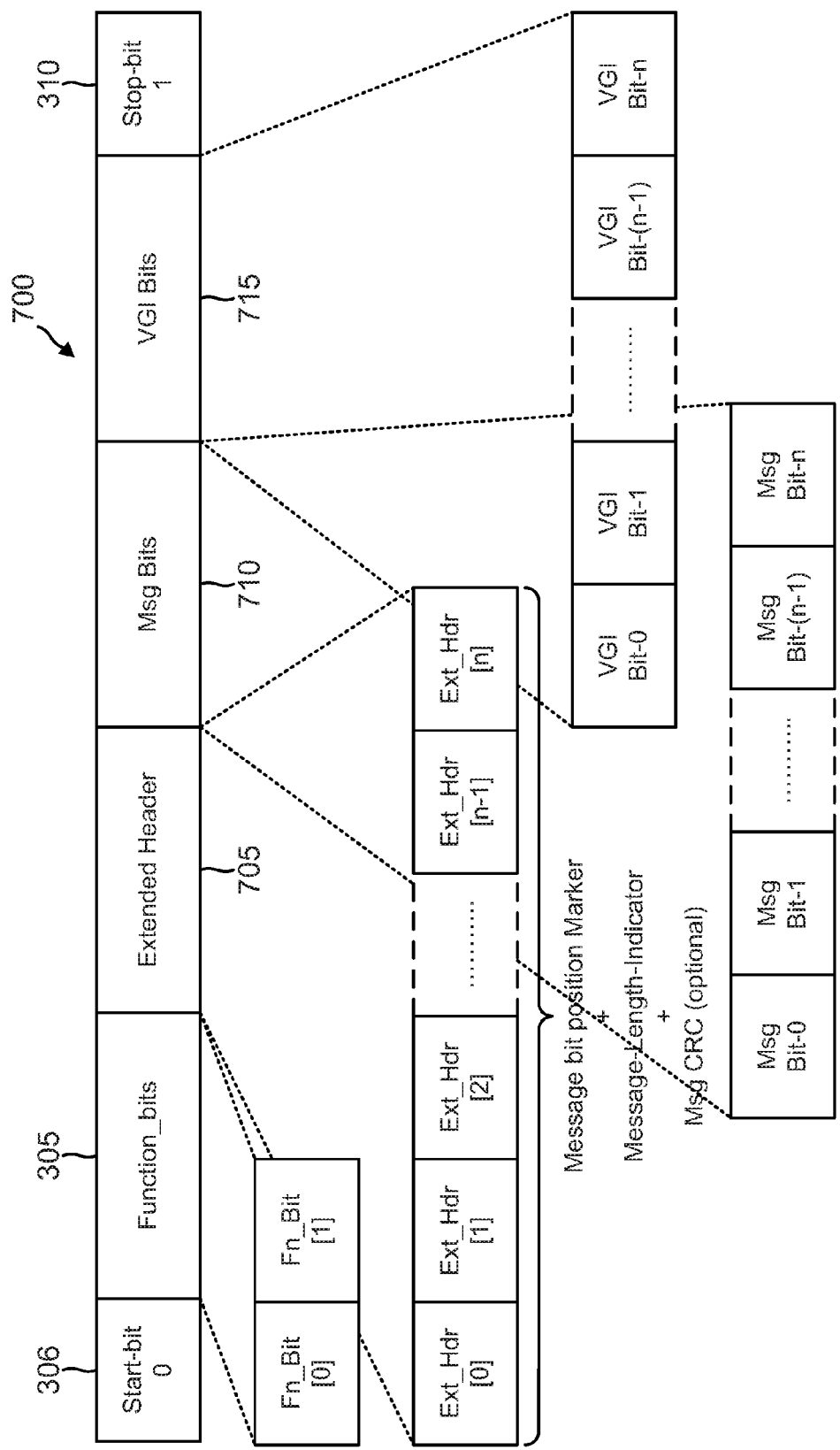
FIG. 7 illustrates a hybrid frame that includes both VGI signals and messaging signals.

As discussed previously, there is an alternative aspect in which a frame from a transmitting VGI FSM 115 includes both VGI signals 135 and UART signals 136. These frames may be denoted herein as "hybrid" frames since they mix UART signals 136 with VGI signals 135. For example, FIG. 7 shows an example hybrid frame 700 that includes a start bit 306 followed by function header 305 as well as an extended header 705. The extended header 705 indicates the bit position of a set of messaging signal (e.g., UART) bits 710 and a set of VGI bits 715 following the extended header 705 and before the stop bit 310. Depending upon the latency requirements, the UART bits 710 or the VGI bits 715 may be first in the frame body. In some aspects, the extended header 705 may include error correction bits such as cyclic redundancy check (CRC) bits. Note that the extended header 705 need merely identify the position and length of just the VGI bits 715 or just the UART bits 710 since the remaining bits are thus known by default to belong to the remaining bit positions. To identify the number of bits contained in the VGI bits 715 or the number of bits contained in the UART bits 710, the extended header bits ranging from a zeroth extended header bit EXT_Hdr[0] to an nth extended header bit EXT_Hdr[n] may each identify a corresponding power of two as discussed with regard to the programming payloads of FIG. 5.

Figure 8:
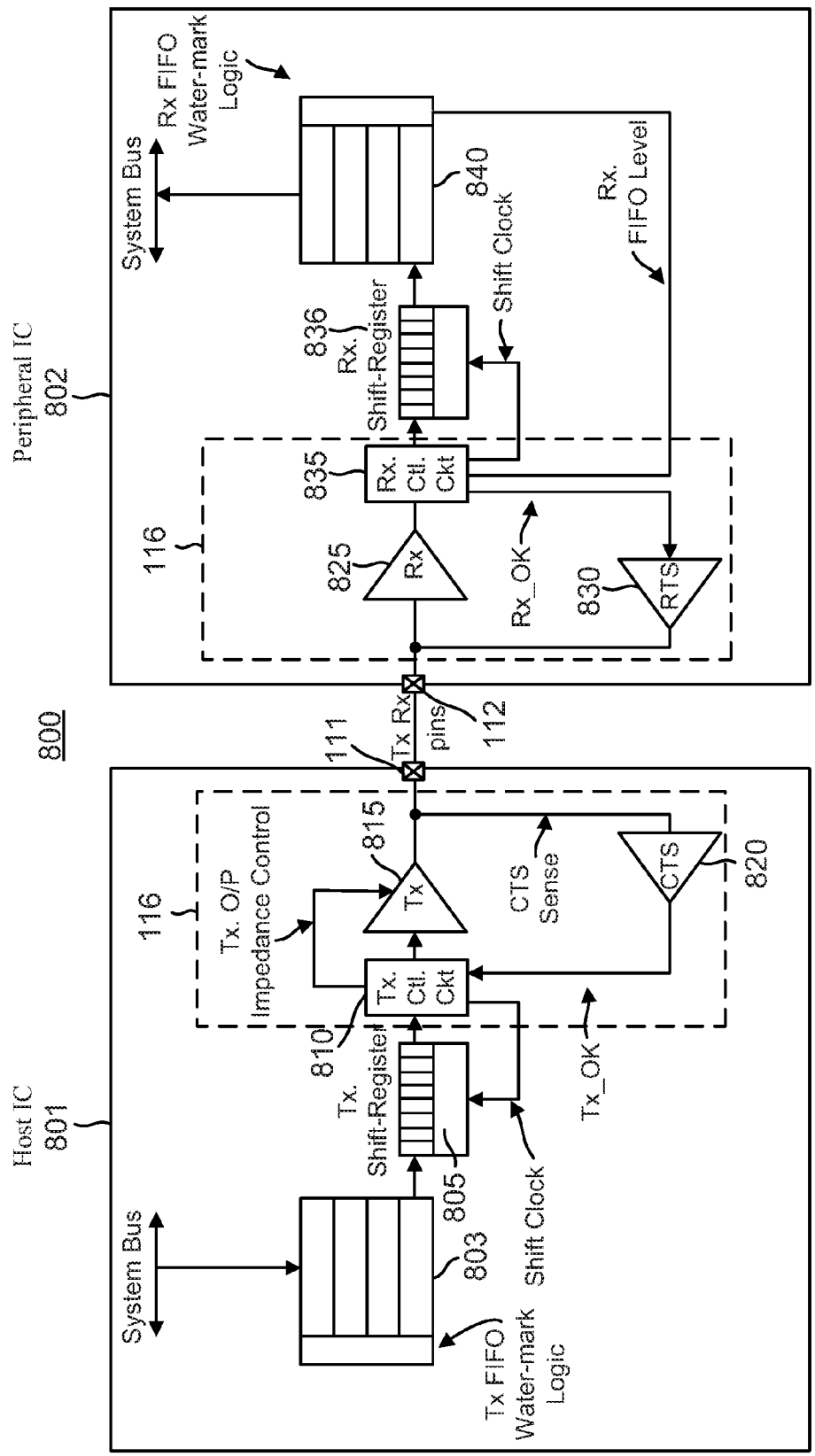
FIG. 8 illustrates an impedance-based flow control circuitry for the system of FIG. 1.

Impedance-based flow control as implemented through each UART interface 116 will now be addressed. FIG. 8 illustrates aspects of the flow control circuitry for a system 800 including a host integrated circuit (IC) or device 801 and a peripheral IC or device 802. For illustration clarity, only the transmitting circuitry is shown in UART interface 116 in the host IC 801. Similarly, only the receiving circuitry is shown in UART interface 116 in the peripheral IC 802. Due to the simplification, only the transmit (TX) pin 111 is shown on the host IC 801. Similarly, only the receive (RX) pin 112 is shown on the peripheral IC 802. It will be appreciated, however, that these interfaces contain both types of pins as discussed with regard to FIG. 1. The VGI FSM 115 in host IC 801 is represented by a shift register 805 and by a shift register 836 in the peripheral IC 802.

A processor or other data source (not illustrated) in the host IC 801 provides source data such as GPIO signals or UART signals. In the system 800, the frames (not illustrated) transmitted over the transmit pin 111 may be either VGI frames 600, UART frames 605, or hybrid frames 700 as discussed earlier. The VGI FSM 115 (as represented by the shift register 805) in the host IC 801 also includes or associates with a first-in-first-out (FIFO) memory 803 that receives the data from the system bus, it will be appreciated that the corresponding GPIO interface 103 (for the transmission of VGI frames 600) is not shown in system 800 for illustration clarity. The peripheral IC 802 includes a corresponding FIFO memory 840 coupled to its system bus. As is conventional, each FIFO memory 803 and 840 may include FIFO water-mark logic to monitor its ability to receive additional data. According to its first-in-first-out logic, host FIFO memory 803 will load its earliest-loaded data into transmit shift register 805. A transmit control circuit 810 in the UART interface 116 strobes the transmit shift register 805 to shift in its contents using a shift clock that cycles once every sixteen cycles of a 16× oversampling clock signal (not illustrated). Other oversampling clock rates may be used in alternative aspects. Transmit control circuit 810 receives the shifted-in bits from the transmit shift register 805 and controls a transmit (Tx) buffer 815 to drive the voltage of the transmit pin 111 according to the binary value of the shifted-in bits. For example, Tx buffer 815 may respond to a shifted-in binary one to drive its transmit pin 111 with the power supply voltage over sixteen cycles of the 16× oversampling clock signal to transmit a binary one. Conversely, the transmit buffer 815 is configured to respond to a shifted-in zero bit to ground its transmit pin 111 over sixteen cycles of the 16× oversampling clock signal to transmit a binary zero. It will be appreciated that VGI FSM 115 (FIG. 1) will insert the desired start bits, headers, extended headers, identity bits, and stop bit into the resulting shifted out frame of data from the transmit shift register 805 as discussed earlier.

As will be explained further below, the transmit buffer 815 is configured to select between two output impedances a high output impedance and a low output impedance. From the start bit through to the data payload transmission of a frame, the transmit control circuit 810 commands the transmit buffer 815 to use its low output impedance. In addition, the transmit control circuit 810 commands the transmit buffer 815 to use its low output impedance over some initial portion of the frame's stop bit such as over one or two cycles of the 16× oversampling clock signal. The transmit control circuit 810 then commands the transmit buffer 815 to uses its high output impedance for the remainder of the stop bit transmission and also during any waiting period between frame transmissions. The high output impedance is substantially greater than the low output impedance.

During the high output impedance portion of the stop bit transmission, a clear-to-send (CTS) control circuit 820 in the host's UART interface 116 detects whether the transmit pin voltage is a binary one or a binary zero using some threshold level such as one half of the power supply voltage (or more generally, a transmit voltage used by the transmit buffer 815 to transmit binary one values, which may equal the power supply voltage or may be reduced to save power). Based upon the binary value of the transmit pin voltage, the CTS control circuit 820 may then drive its output signal (Tx_OK) accordingly. For example, a binary zero value for the output signal Tx_OK may trigger the transmit control circuit 810 to not strobe the shift register 805 to shift in a subsequent frame following the stop bit transmission for the current frame. This idle state will continue until the CTS control circuit 820 again detects that the transmit pin voltage is a binary high value such that the CTS control circuit 820 asserts its output signal Tx_OK accordingly. The transmit control circuit 810 may then command the transmit buffer 815 into its low output impedance state to begin another frame transmission (assuming there is one to transmit, which depends upon the state of the host's FIFO buffer or memory 803).

In the peripheral IC 802, a receive (RX) buffer 825 in its UART interface 116 is configured to receive each frame over the receive pin 112. For example, the RX buffer 825 may include an inverter (or a comparator, not illustrated) in which the receive pin 112 voltage drives the gates of the inverter transistors. Since MOSFET transistors present a relatively high impedance at their gates, the RX buffer 825 has a correspondingly high input impedance. The RX buffer 825 is configured to sample each bit in the received frames responsive to an oversampling clock signal (not illustrated). At a 16× oversampling rate, each bit in a received frame is represented by 16 samples. Based upon the binary state of each set of 16 samples, the RX buffer 825 makes a bit decision to drive a resulting received bit to a receive control circuit 835 that in turn shifts the received bit into receive shift register 836 responsive to a strobe of a shift clock. The strobing of the receive shift register 836 may thus have a period equaling sixteen cycles of the 16× oversampling clock signal. Once an entire frame is loaded into the shift register 836, the resulting frame may be shifted into receive FIFO buffer 840 so that it may be eventually presented in parallel over a system bus to a processor or other data sink (not illustrated) in the peripheral IC 802.

The input impedance for the RX buffer 825 is fixed to a high impedance value as discussed above. But a request-to-send (RTS) control circuit 830 can select between two input impedances for the receive pin 112—a low input impedance and a high input impedance. The high input impedance is typically considerably higher than the high output impedance for the host IC 801 (e.g., 10KΩ). The low input impedance is considerably less than the high input impedance. During a default mode and also when receiving the start bit through to the data payload of the current frame, the RTS control circuit 830 presents its high input impedance to the receive pin 112. During this low input impedance presentation, the RTS control circuit 830 is effectively isolated from affecting the receive pin voltage. The receive control circuit 835 detects the beginning of a received stop bit for a current frame and checks a receive (RX) FIFO level within the receive FIFO buffer 840 to determine if the receive FIFO buffer 840 has sufficient storage available to receive another frame. Like transmit FIFO buffer 803, the receive FIFO buffer 840 may include water-mark logic or other suitable circuits to generate the RX FIFO level signal. If there is sufficient storage available, the receive control circuit 835 does not change the default high output impedance for the RTS control circuit 830 over the remaining portion of the stop bit for the current frame. But if there is not sufficient storage available, the receive control circuit 835 commands the RTS control circuit 830 to select for its low input impedance (e.g., 50 ohms). This low input impedance may substantially equal the low output impedance for the peripheral IC 802. The resulting voltage divider caused by the low input impedance of the RTS control circuit 830 in the peripheral IC 802 compared to the high output impedance of transmit buffer 815 in the host IC 801 causes the RTS control circuit 830 to rapidly deplete the charge on the receive pin 112, which in turn discharges the transmit pin 111 for the host IC 801. The CTS control circuit 820 in the host IC 801 then detects the transmit pin voltage drop so that the host IC 801 goes into a waiting mode in which it refrains from sending an additional frame until the transmit pin voltage is restored. The RX control circuit 835 in the peripheral IC 802 determines when its RX FIFO level indicates that there is sufficient storage capability to receive another frame, whereupon the RX control circuit 835 commands the RTS control circuit 830 to resume its default high output impedance. The resulting recovery of the transmit pin voltage at the host IC 801 then triggers the transmission of another frame. The flow control between the host IC 801 and the peripheral IC 802 thus requires no separate CTS or RTS pins.

Figure 9:
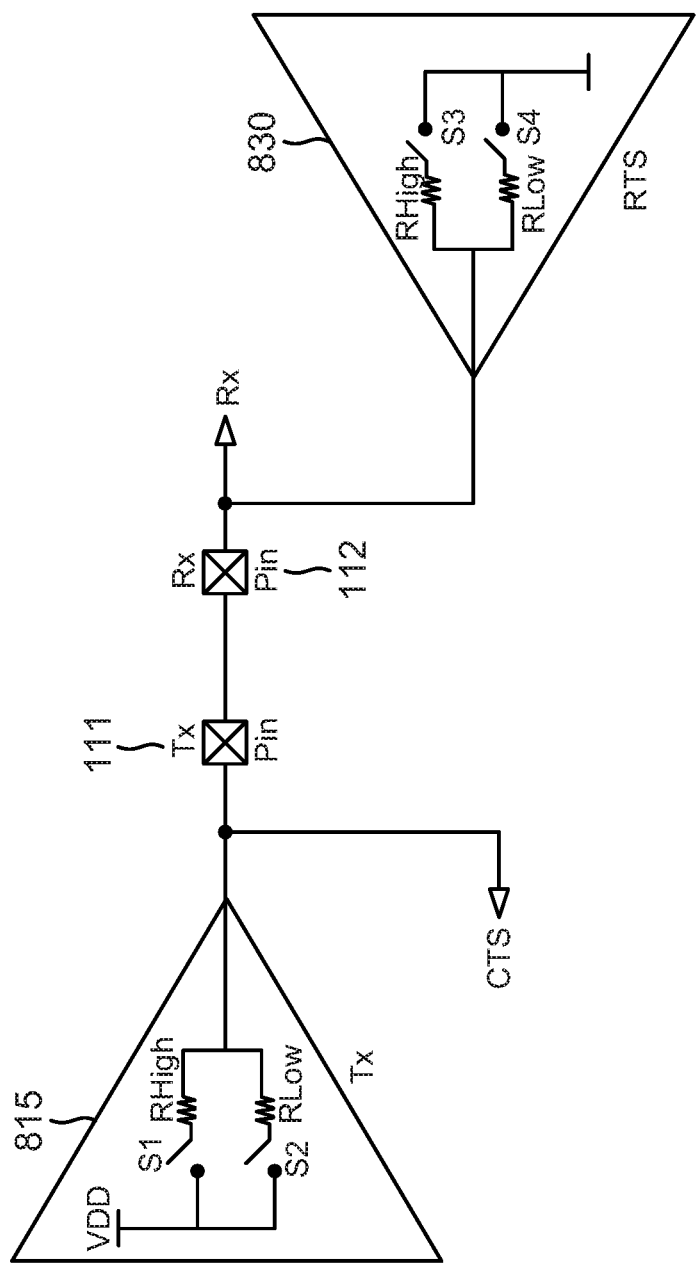
FIG. 9 illustrates further details for the TX buffer and RTS control circuit in the system of FIG. 8.

An example aspect for the TX buffer 815 and the RTS control circuit 830 is shown in FIG. 9. A switch S1 in the TX buffer 815 couples to the transmit pin 111 through a resistor RHigh. Similarly, a switch S2 couples to the transmit pin 111 through a resistor RLow. The resistance of RHigh is the high output impedance discussed above, such as 10K ohms, whereas the resistance of resistor RLow is the low output impedance also discussed above, such as 50 ohms. During the transmission of a frame from its start bit through the end of the data payload, the switch S2 in the TX buffer 815 is closed whereas the switch S1 is opened. This beginning portion of a frame (indeed the majority of the frame) is thus transmitted using the low output impedance. This low output impedance continues over at least the first oversampling clock cycle for the frame's stop bit. For the remainder of the stop bit transmission, the switch S1 is closed and the switch S2 is open so that the remainder of the stop bit is transmitted using a high output impedance.

The RTS control circuit 830 includes an analogous arrangement of switches S3 and S4 and an analogous pair of resistors RHigh and RLow. During the majority of the received frame reception (from the start bit through an initial sample of samples of the stop bit), the switch S3 is closed and the switch S4 is open to present a high input impedance (the resistance of resistor RHigh) to the receive pin 112. The resulting voltage division between the peripheral IC's high input impedance and the host IC's low output impedance enables the TX buffer 815 to quickly charge its transmit pin voltage (or discharge depending on each bit's binary value) during this initial portion of the transmitted/received frame. When the TX buffer 815 switches to its high output impedance for the remainder of the stop bit transmission, the RTS control circuit 830 closes the switch S4 and opens the switch S3 to present a low input impedance to the receive pin 112 if there is insufficient room in the RX FIFO buffer 840. If there is sufficient room, the switch S3 remains closed and the switch S4 remains open.

Figure 10:
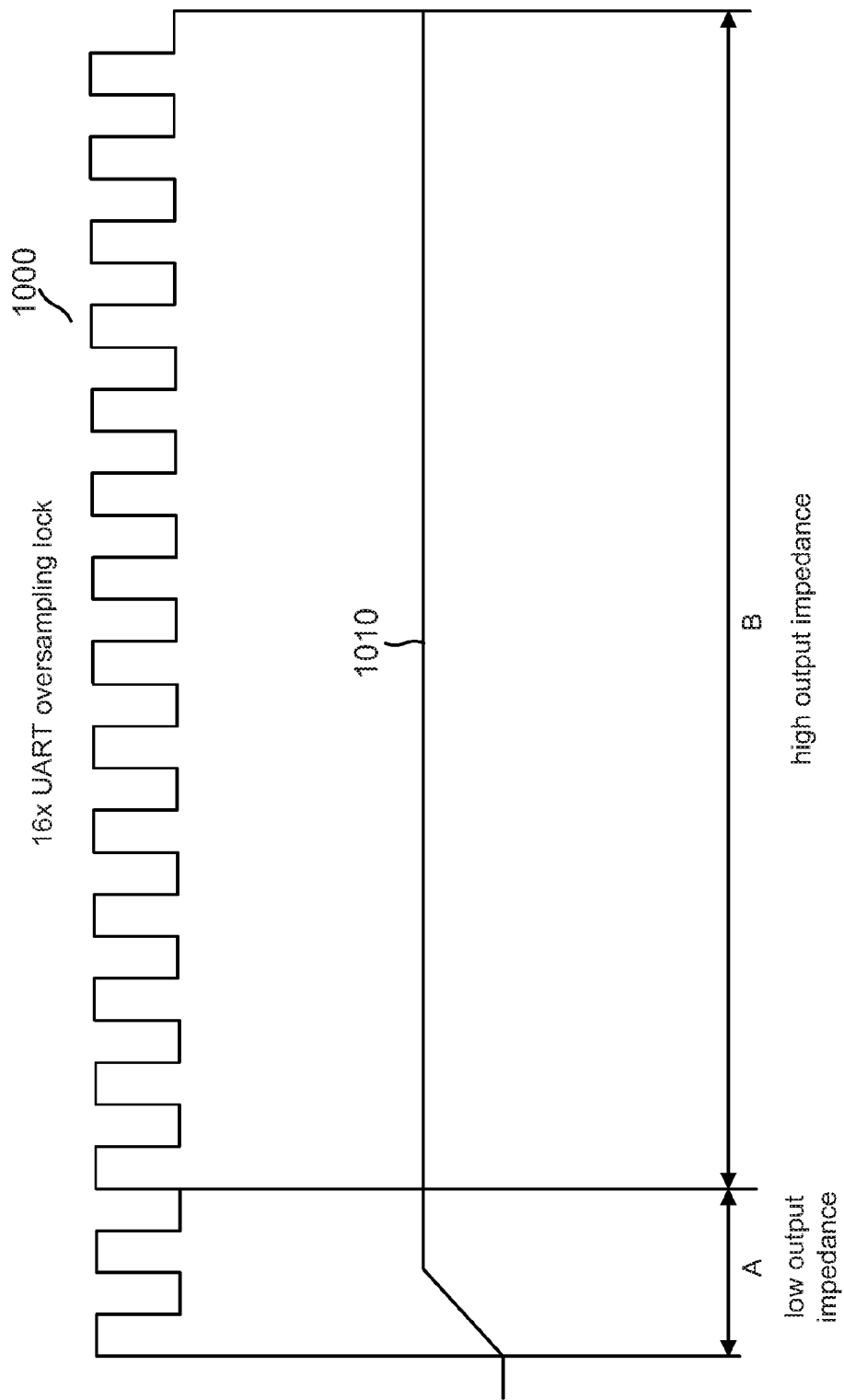
FIG. 10 illustrates the varying output impedances for a stop bit in a frame transmitted by the system of FIG. 8.

The timing for the output impedance for the TX buffer 815 during the transmission of a stop bit 1010 such as discussed with regard to FIG. 3 is illustrated in FIG. 10. The duration of an initial low output impedance period A and a subsequent high output impedance period B are determined responsive to cycles of a 16× UART oversampling clock signal 1000, in one aspect, the initial low output impedance period A occurs during the first two cycles of the 16× UART oversampling clock signal 1000. The high output impedance period B would then occur over the remaining fourteen cycles of the 16× UART oversampling clock signal 1000 in such an aspect. In light of the initial low output impedance period, stop bit 1010 may quickly be driven to the desired logic high level.

Figure 11:
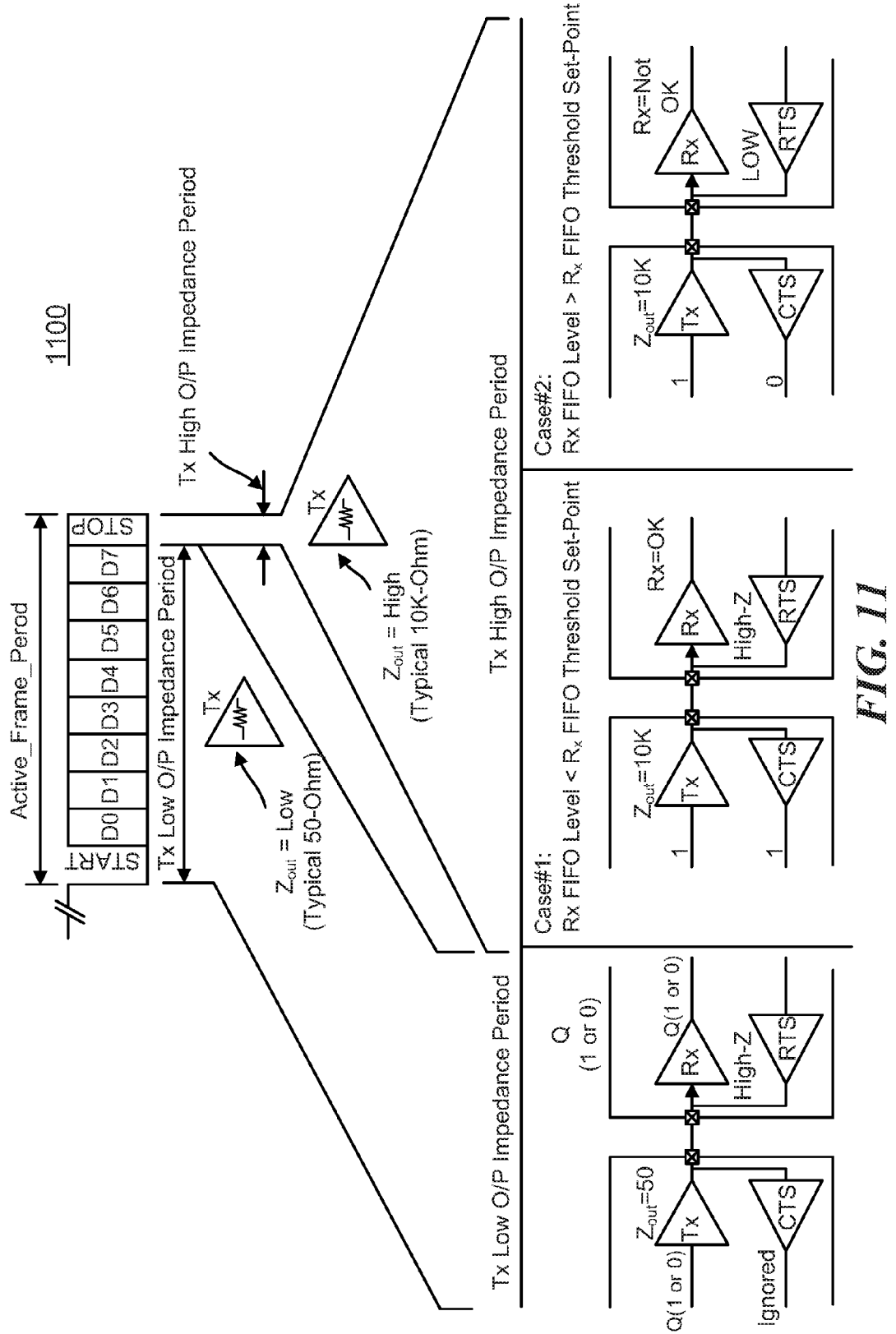
FIG. 11 illustrates a low impedance period and high impedance period for a data frame in accordance with an aspect of the disclosure.

An example frame 1100 transmitted by a transmitting device is shown in FIG. 11. In addition, the impedance state for the TX buffer (indicated by "TX") in the host IC 801 and the impedance state for the RTS control circuit (indicated by "RX") in the receiving device are also shown. In this aspect, the frame 1100 has an eight bit data payload but such a length may be varied in alternative aspects. The transmitting device begins frame 1100 by pulling its transmit pin low for the start bit duration. Like the data bits and the stop bit in the frame 1100, the start bit may have a period corresponding to sixteen cycles of a 16× oversampling clock signal. In alternative aspects, a different oversampling rate may be used to time the duration of the bits in the frame 1100. The frame 1100 ends in a stop bit during which the TX buffer attempts to charge the transmit pin voltage high.

The RX buffer samples the received frame using its oversampling clock signal such as a 16× oversampling clock signal. During the transmission of the start bit, the subsequent data bits (the function bits in the header are not shown in frame 1100 for illustration clarity but these bits would also be transmitted at a low output impedance), and an initial portion of the stop bit, the TX buffer uses its low output impedance (Zout equaling 50 ohms). During this time, the RTS control circuit in the receiving device uses its high input impedance ("High-Z") so that the TX buffer can quickly swing the voltage of its transmit pin to the appropriate binary value (VDD or ground) responsive to the binary value of each transmitted bit. In addition, the TX buffer can also quickly charge the transmit pin to the power supply voltage during the initial portion of the stop bit such as over one cycle of the 16× oversampling clock. Over the remaining cycles of the oversampling clock for the stop bit as discussed previously with regard to FIG. 10, the TX buffer uses its high output (O/P) impedance. There are two receiver states illustrated in FIG. 11 for this TX buffer high output impedance period during the remainder of the stop bit transmission. In a first state (Case #1), the RX FIFO level is below a FIFO threshold set point such as determined within the receiver control circuit (not illustrated). Such a condition indicates that there is storage capability within the receive FIFO buffer (also not illustrated). The RTS control circuit in the receiving device thus maintains its default high output impedance for the duration of the stop bit. In a second state (Case #2), the RX FIFO level is greater than a FIFO threshold set point. The TX buffer initially drives a beginning portion of the stop bit using a low output impedance so that the transmit pin voltage may be readily charged to the power supply voltage during this initial stop bit period.

In response to detecting the high voltage of the receive pin for the initial portion of the stop bit, the RTS control circuit in the receiving node can do one of two things—it may couple the receive pin to ground through a low input impedance or through a high input impedance. The RTS control circuit makes such a selection as discussed above. If the receiving UART interface is ready to receive a frame (indicated in FIG. 11 as an RX=OK condition for Case #1), the RTS control circuit couples the receive pin to ground through a high input impedance, preferably a high input impedance that is considerably larger than the high output impedance used in the TX buffer. The result is that the TX buffer and the RTS control circuit form a voltage divider that maintains the receive pin voltage high if the receiving UART interface is ready to receive a frame. The transmitting modified UART interface senses this high voltage through its CTS control circuit. If the CTS control circuit senses that its transmit pin voltage is high during the high output impedance portion of the stop bit period, the transmitting modified UART interface is free to send another frame of data.

If, on the other hand, the receiving modified UART interface is not ready to receive another frame of data (as indicated in FIG. 11 10 by an RX=Not OK condition for Case #2), the RTS control circuit couples the receive pin to ground through a relatively low impedance while it receives the stop bit. Because the TX buffer is driving the transmit pin high though a high output impedance, the result is that the receive pin and transmit pin voltages will be substantially discharged to ground, which is interpreted by the transmitting device as a CTS signal=0 condition. The CTS control circuit in the transmitting modified UART interface senses this low voltage on its transmit pin as a conventional UART interface would sense a low state of the (now non-existent) CTS pin such that the transmitting device will refrain from sending another frame of data. When the RTS control circuit in the receiving UART interface couples its receive pin to ground through its high input impedance as in Case #1 of FIG. 11, the transmitting UART interface may proceed to transmit another frame.

Although the preceding discussion concerned flow control without the use of conventional RTS and CTS pins, it will be appreciated that an RTS pin and a CTS pin may be provided in aspects that require backward compatibility with conventional UART transmission.

Figure 12:
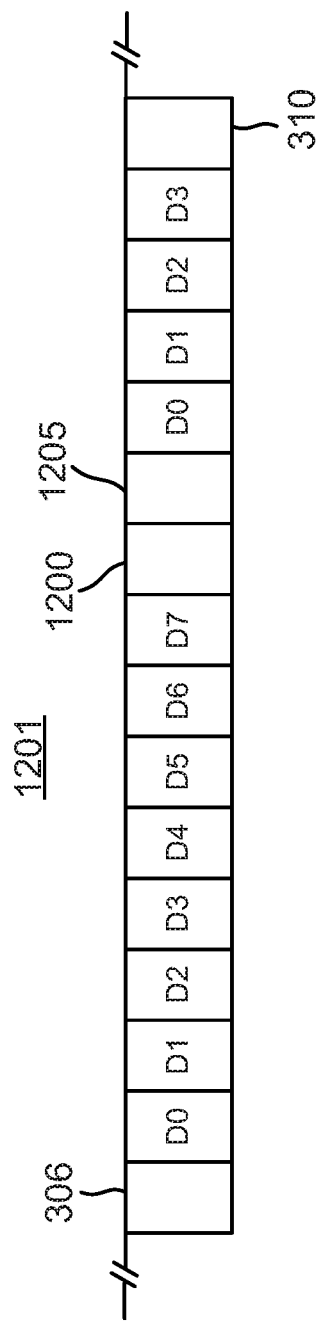
FIG. 12 is a diagram of a frame including an intermediate stop bit and an intermediate start bit in accordance with an aspect of the disclosure.

Given the flexible frame lengths enabled herein, note that the frame length may be increased such that the lack of synchronization between the oversampling clocks in the transmitting and receiving devices could lead to errors. In that regard, a 10-bit data payload for a frame will be represented by 160 samples assuming that a 16× oversampling clock is used. At this same sampling rate, a 20-bit data payload would be represented by 320 samples. As the number of samples increases, it becomes more likely that a receiving integrated circuit will under or over sample a given bit in the frame since the oversampling clocks in disparate devices are not synchronized. To maintain synchronicity, larger frames may include intermediate stop bits and start bits. The function bits discussed previously may program for the location of these intermediate bits in larger frames. For example, if it is known that a large frame will include an intermediate stop bit after the first 10 bits, then the receiving device can expect to have made 160 samples prior to the receipt of the intermediate stop bit (assuming that a 16× oversampling rate is used). If there are more or less samples, then the receiving device may adjust its oversampling rate accordingly to remain sufficiently synchronous with the transmitting device's oversampling rate. An example frame 1201 having an intermediate stop bit 1200 followed by an intermediate start bit 1205 is shown in FIG. 12. Frame 1201 begins with a start bit 306 and ends with a stop bit 310 as discussed with regard to frame 300 of FIG. 3. Intermediate stop bit 1200 follows the first eight data bits D0 through D7, in contrast to stop bit 310, no varying output impedance for the transmission of intermediate stop bit 1200 is required—the corresponding TX buffer may drive the transmit pin to the power supply voltage for that bit. Conversely, the TX buffer would ground the transmit pin to transmit the intermediate start bit 1205.

Not only does the variable output impedance advantageously aid in the establishment of flow control over the two-wire interface, it also inherently protects against back-power conditions following power-on of the devices. In that regard, it may be the case as the devices are powered-on that one integrated circuit is the first to drive its transmit pin voltage high while a receiving device is still powered down. This asserted voltage being received at a powered-off device may form forward-biased parasitic diodes at the receiving device that waste current and also lead to latch-up or other glitches as the receiving device is finally powered-on. This problem is conventionally denoted as a back-power condition. But the default high output impedance for the TX buffers disclosed herein inherently avoids this problem because it takes a certain amount of current to forward bias the parasitic diode in the receiving device. The high output impedance for the TX buffer limits the current drawn by the powered-off receiving device such that no back-power condition is created.

In addition, the high output impedance used at power-up is advantageous during an enumeration process. At power-on reset, prior to the initial enumeration, the transmit pin's voltage level remains at "1" with a high output impedance. The device which asserts the transmit pin with a state of "1" first gains the "master" status. This means that prior to setting the transmit pin to "1," the device checks the signal status at its receive pin. Since the master SoC always powers on first, its role as master is therefore ensured with this simple protocol. This same behavior (first to turn-on becomes master) also resolves any conflict which may arise in a VGI interface involved in multi-drop configuration.

In a remote corner case condition, due to a de-bounce timing difference (which may occur from one device to another in multi-drop configuration), the first iteration of the early enumeration results in failure. A subsequent attempt starts with the asynchronous local clock on each side trying to take lead as the master. Since the probability of the asynchronous clock's positive-edge on the two sides having zero phase difference is infinitely small, one of the two devices will always become the master.

Figure 13:
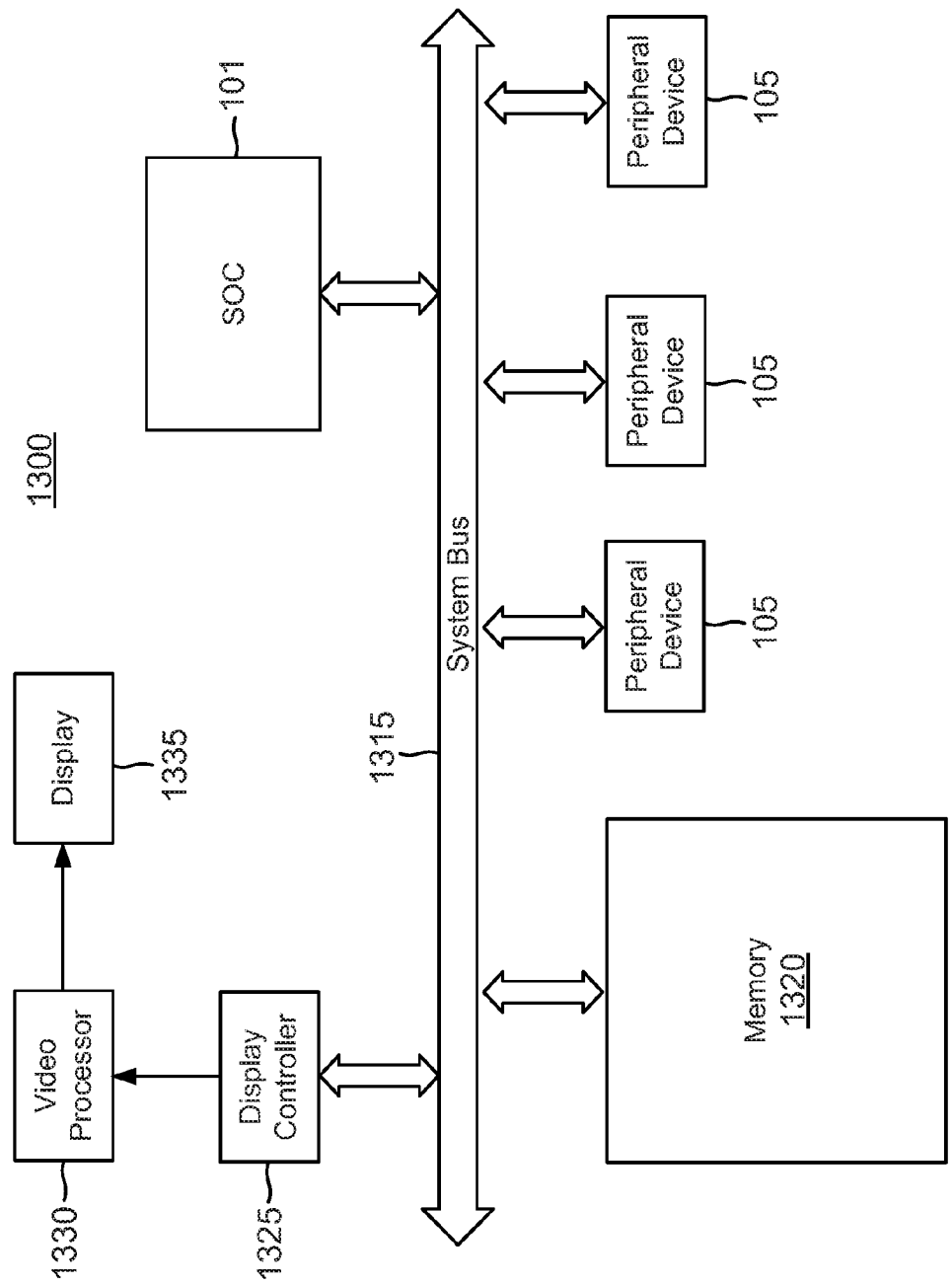
FIG. 13 is a block diagram for an example electronic system incorporating one of the integrated circuits shown in the system of FIG. 1.

The host device 101 in the VGI architecture 100 of FIG. 1 may be incorporated as a system-on-a-chip (SOC) 1305 in a mobile device 1300 as shown in FIG. 13. Mobile device 1300 may comprise a cellular phone, smart phone, personal digital assistant, tablet computer, laptop computer, digital camera, handheld gaming device, or other suitable device. SOC 1305 communicates with peripheral ICs 1310 as discussed analogously with regard to the VGI architecture 100 using two wires within a system bus 1315. System bus 1315 also couples to a memory such as a DRAM 1320 and to a display controller 1325. In turn, display controller 1325 couples to a video processor 1330 that drives a display 1335.

Overview of a Technique for Link State Detection and Wakeup in Power State Oblivious Interface A virtual general purpose input/output interface (VGI) finite-state machine (FSM) and an associated physical interface (e.g., UART or other interface) implementation in an Always-ON (AON) power domain may be an ideal silicon level implementation. However, many implementation tradeoffs may not allow this path to be followed.

Integrating VGI on a system on chip (SoC) may have the restriction of placing a VGI block in a Non-Always-ON (Non-AON) power domain. The Non-AON power domain is by nature power collapsed in a low power state, i.e., not always on (not always active). When the VGI FSM and the physical interface are implemented in the Non-AON power domain, the VGI FSM and physical interface will not be immediately operational when transitioning from a low power state to an active power state. Therefore, the Non-AON power domain implementation of VGI may require a wakeup mechanism, which can be implemented using modem power manager (MPM) blocks and/or resource power manager (RPM) blocks.

Enablement of a current wakeup mechanism comes at the expense of additional latency. Although such latency may be acceptable in many cases, the current wakeup mechanism still does not resolve the problems associated with power state blindness/obliviousness of devices (e.g., host device and peripheral device) interconnected by a common physical interface. A root cause of the power state blindness/obliviousness lies in the fact that the idle state of the physical interface remains the same (e.g., logic HIGH or logic LOW) regardless of the power states of the interconnected devices. Thus, one interconnected device may not know if the other interconnected device is in an active state or sleep state. A device not knowing a current power state of another device may send a message to the other device at a high risk of the message being lost. Therefore, what is needed is an architectural solution that informs a transmitting device of the possibility of a transmitted message being lost due to a receiving device being in a low power state while guaranteeing minimum latency. In an aspect of the present disclosure, a solution is provided that is highly applicable to VGI and/or other types of peer-to-peer (P2P) physical links where connected devices are blind/oblivious to each other's power state and protocol, or an additional hardware pin-based handshake for sleep/wakeup is to be avoided.

Exemplary Operating Environment

Certain disclosed examples relate to systems and apparatus for communicating a signal to a device based on a determined power state of the device.

Figure 14:
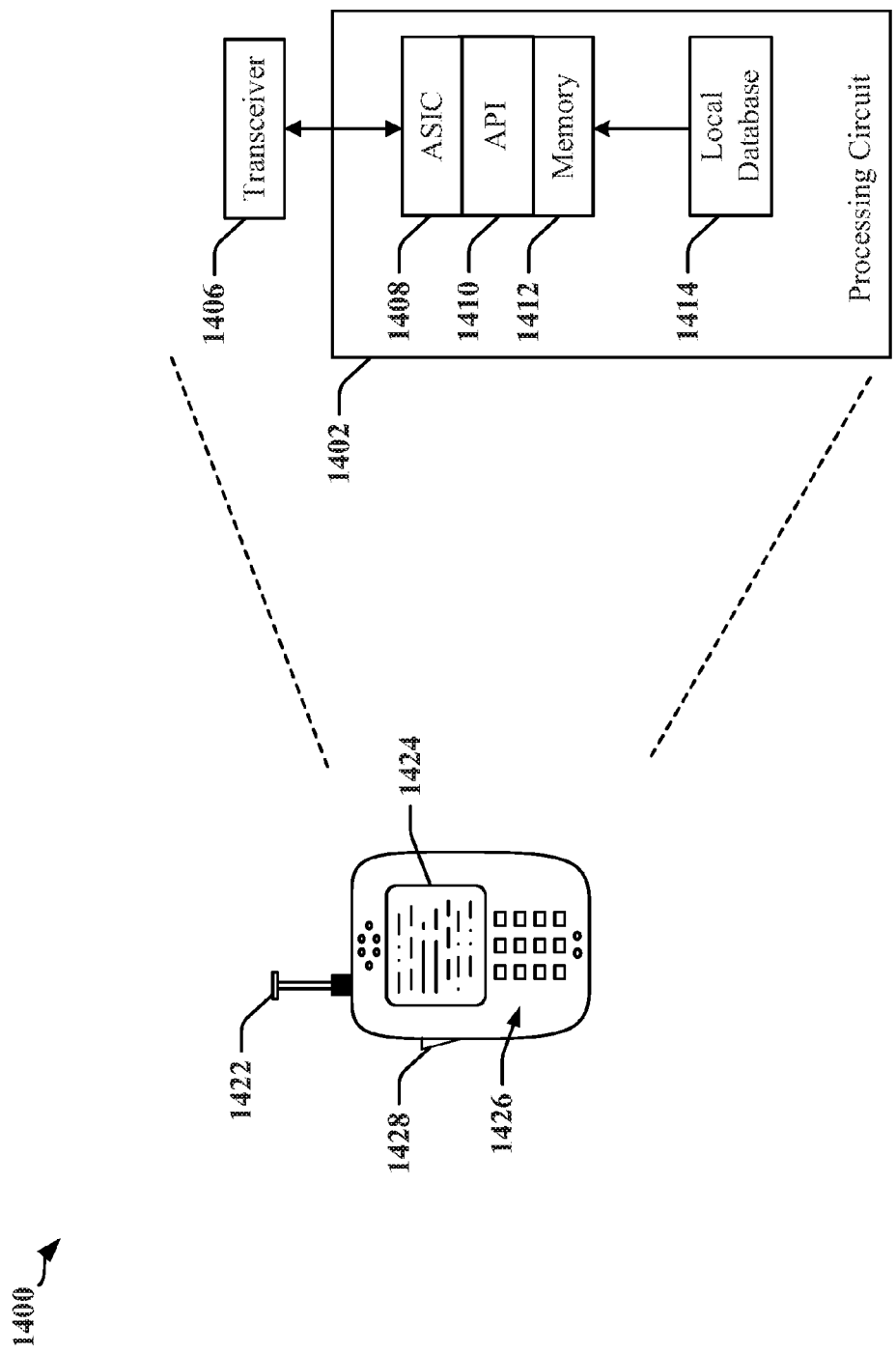
FIG. 14 depicts an apparatus for communicating a signal based on a determined power state of a device.

Certain aspects of the disclosure may be applicable to communications links deployed between electronic components, which may include subcomponents of devices such as telephones, mobile computing devices, appliances, automobile electronics, avionics systems, etc. Referring to FIG. 14, for example, an apparatus 1400 for communicating a signal based on a determined power state of a device may include a processing circuit 1402 that is configured to control operation of the apparatus 1400. The processing circuit 1402 may access and execute software applications and control logic circuits and other devices within the apparatus 1400. In one example, the apparatus 1400 may include a wireless communication device that communicates through a radio frequency (RF) communications transceiver 1406 with a radio access network (RAN), a core access network, the Internet and/or another network. The communications transceiver 1406 may be operably coupled to a processing circuit 1402. The processing circuit 1402 may include one or more IC devices, such as an application specific integrated circuit (ASIC) 1408. The ASIC 1408 may include one or more processing devices, logic circuits, and so on. The processing circuit 1402 may include and/or be coupled to processor readable storage 1412 that may maintain instructions and data that may be executed by the processing circuit 1402. The processing circuit 1402 may be controlled by one or more of an operating system and an application programming interface (API) 1410 layer that supports and enables execution of software modules residing in the storage 1412 of the wireless device. The storage 1412 may include read only memory (ROM) or random access memory (RAM), electrically erasable programmable read only memory (EE-PROM), a flash memory device, or any memory device that can be used in processing systems and computing platforms. The processing circuit 1402 may include and/or access a local database 1414 that can maintain operational parameters and other information used to configure and operate the apparatus 1400. The local database 1414 may be implemented using one or more of a database module or server, flash memory, magnetic media, EEPROM, optical media, tape, soft or hard disk, or the like. The processing circuit may also be operably coupled to external devices such as an antenna 1422, a display 1424, operator controls, such as a button 1428 and a keypad 1426, among other components.

Figure 15:
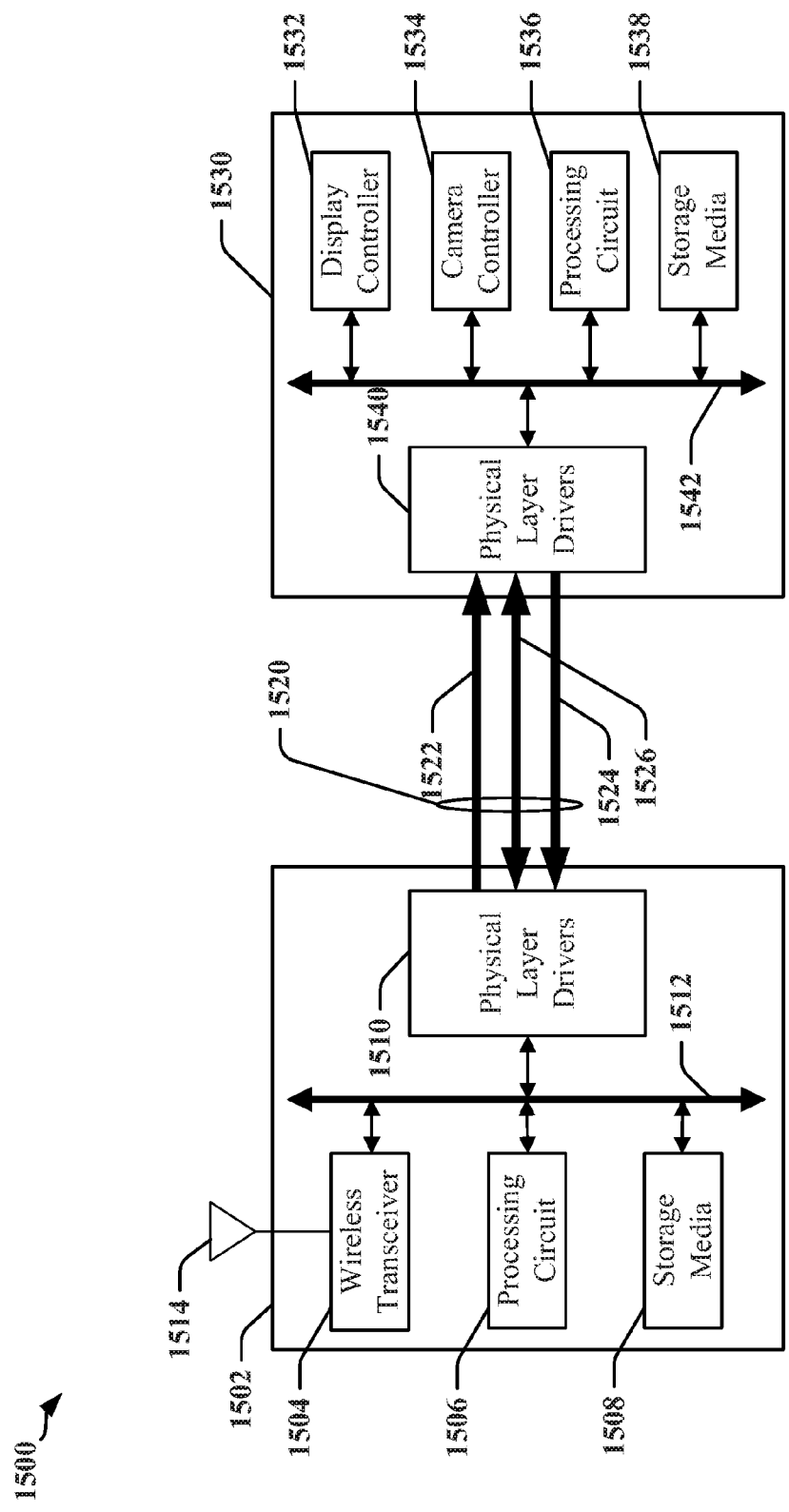
FIG. 15 illustrates a system architecture for an apparatus that facilitates communicating a signal based on a determined power state of a device.

FIG. 15 is a block schematic illustrating certain aspects of an apparatus 1500 such as a wireless mobile device, a mobile telephone, a mobile computing system, a wireless telephone, a notebook computer, a tablet computing device, a media player, a gaming device, or the like. The apparatus 1500 may include a plurality of IC devices 1502 and 1530 that exchange data and control information through a communications link 1520. The communications link 1520 may be used to connect the IC devices 1502 and 1530, which may be located in close proximity to one another or physically located in different parts of the apparatus 1500. In one example, the communications link 1520 may be provided on a chip carrier, substrate or circuit board that carries the IC devices 1502 and 1530. In another example, a first IC device 1502 may be located in a keypad section of a flip-phone while a second IC device 1530 may be located in a display section of the flip-phone. A portion of the communications link 1520 may include a cable or an optical connection.

The communications link 1520 may include multiple channels 1522, 1524 and 1526. One or more channel 1526 may be bidirectional, and may operate in half-duplex mode and/or full-duplex mode. One or more channels 1522, 1524 may be unidirectional. The communications link 1520 may be asymmetrical, providing higher bandwidth in one direction. In one example described herein, a first communications channel 1522 may be referred to as a forward link 1522 while a second communications channel 1524 may be referred to as a reverse link 1524. The first IC device 1502 may be designated as a host, master and/or transmitter, while the second IC device 1530 may be designated as a client, slave and/or receiver, even if both IC devices 1502 and 1530 are configured to transmit and receive on the communications link 1520. In one example, the forward link 1522 may operate at a higher data rate when communicating data from a first IC device 1502 to a second IC device 1530, while the reverse link 1524 may operate at a lower data rate when communicating data from the second IC device 1530 to the first IC device 1502.

The IC devices 1502 and 1530 may each include a processor or other processing and/or computing circuit or device 1506, 1536. In one example, the first IC device 1502 may perform core functions of the apparatus 1500, including maintaining wireless communications through a wireless transceiver 1504 and an antenna 1514, while the second IC device 1530 may support a user interface that manages or operates a display controller 1532, and may control operations of a camera or video input device using a camera controller 1534. Other features supported by one or more of the IC devices 1502 and 1530 may include a keyboard, a voice-recognition component, and other input or output devices. The display controller 1532 may include circuits and software drivers that support a display such as a liquid crystal display (LCD) panel, a touch-screen display, an indicator, and so on. The storage media 1508 and 1538 may include transitory and/or non-transitory storage devices adapted to maintain instructions and data used by the respective processing circuits 1506 and 1536, and/or other components of the IC devices 1502 and 1530. Communication between each processing circuit 1506, 1536 and its corresponding storage media 1508 and 1538 and other modules and circuits may be facilitated by one or more buses 1512 and 1542, respectively.

The reverse link 1524 may be operated in the same manner as the forward link 1522. The forward link 1522 and the reverse link 1524 may be capable of transmitting at comparable speeds or at different speeds, where speed may be expressed as a data transfer rate and/or a clocking rate. The forward and reverse data rates may be substantially the same or may differ by orders of magnitude, depending on the application. In some applications a single bidirectional link 1526 may support communications between the first IC device 1502 and the second IC device 1530. The forward link 1522 and/or the reverse link 1524 may be configurable to operate in a bidirectional mode when, for example, the forward and reverse links 1522 and 1524 share the same physical connections and operate in a half-duplex manner.

In certain examples, the reverse link 1524 derives a clocking signal from the forward link 1522 for synchronization purposes, for control purposes, to facilitate power management and/or for simplicity of design. The clocking signal may have a frequency that is obtained by dividing the frequency of a symbol clock used to transmit signals on the forward link 1522. The symbol clock may be superimposed or otherwise encoded in symbols transmitted on the forward link 1522. The use of a clocking signal that is a derivative of the symbol clock allows fast synchronization of transmitters and receivers (transceivers 1510, 1540) and enables fast start and stop of data signals without the need for framing to enable training and synchronization.

Figure 16:
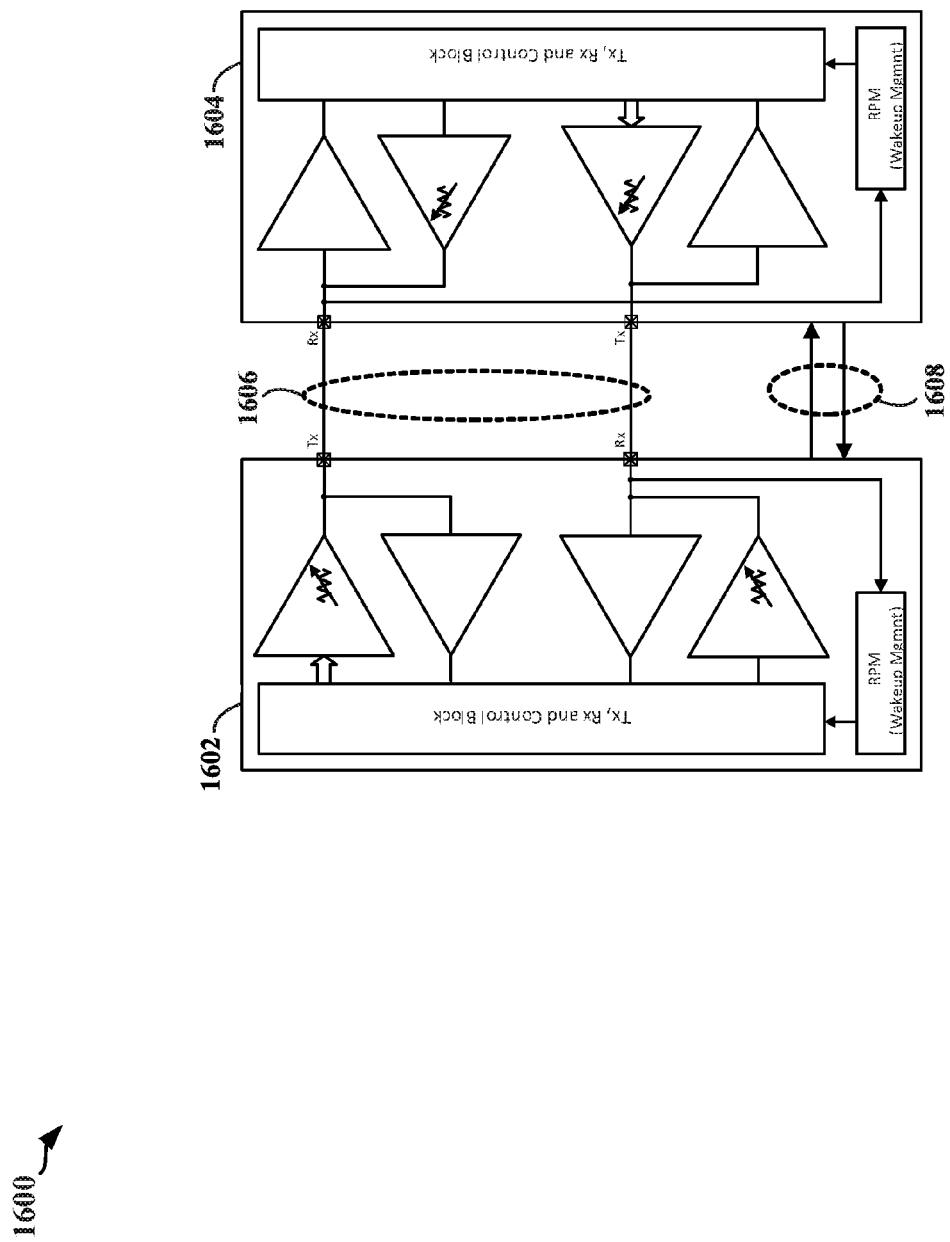
FIG. 16 is a diagram illustrating devices interconnected by a physical interface.

In certain examples, a single bidirectional link 1526 may support communications between the first IC device 1502 and the second IC device 1530. In some instances, the first IC device 1502 and the second IC device 1530 provide encoding and decoding of data, address and control signals transmitted between a processing device and memory devices such as dynamic random access memory (DRAM).
Exemplary Description of Communicating a Signal to a Device Based on a Determined Power State FIG. 16 is a diagram 1600 illustrating devices interconnected by a physical interface. In FIG. 16, a first device 1602 is interconnected to a second device 1604 by a common physical interface 1606. An idle state of the physical interface 1606 prevents a transmitting device (e.g., first device 1602) from acquiring information regarding a power state of a receiving device (e.g., second device 1604). That is, when the physical interface 1606 is idle, the physical interface 1606 does not indicate the power state (active/non-active) of the receiving device 1604 to the transmitting device 1602. Hence, a packet transmitted from the transmitting device 1602 is very likely to be lost if the transmission occurs during a sleep state of the receiving device 1604. Any software-based or protocol-based solution to prevent such loss is problematic as it would add unwanted latency. Moreover, any hardware-based solution, such as involving additional handshake lines 1608, to prevent such loss is also problematic as it would add to package and system level cost.

A current solution for addressing the power state blindness/obliviousness of the first device 1602 and the second device 1604 interconnected by the physical interface 1606 is to implement the physical interface 1606 in an Always-ON (AON) domain to ensure that the link between the first device 1602 and the second 1604 is always ready for communication. However, such a solution has a number of problems. First, an implementation based on the AON power domain produces a power penalty, which negatively impacts a run time of a device. Second, the validity of the AON implementation also demands that both interconnected devices be in the AON domain. However, this is difficult to guarantee in a situation where plug-n-play devices from different original equipment manufacturers (OEMs) are supported, and such devices may not have guaranteed AON capability. Third, even if power penalties are ignored, a system on chip (SoC) level implementation of the AON implementation poses several issues with respect to die partitioning, package pin allocation, and printed circuit board (PCB) routing.

According to aspects of the disclosure, a novel solution for optimally resolving problems associated with power state blindness/obliviousness of devices interconnected by a common physical interface includes a number of features. For example, hardware and software aspects of an interface architecture can be added to an existing physical interface/link to facilitate power state detection with minimum latency and enable a transmitting device to automatically re-attempt transmission of a message, packet, and/or signal if the transmitting device determines that a receiving device is in a sleep (not active) state. In another aspect of the disclosure, a power state-aware loopback gateway is provided that is automatically enabled by the receiving device for message loopback to the transmitting device when the receiving device is in the sleep state. In a further aspect of the disclosure, a simple protocol is provided that identifies a received message as a valid transmission from the receiving device or as a loopback echo (of a previously transmitted message from the transmitting device) when the receiving device is in the sleep state. In an aspect of the disclosure, if the transmitting device determines that the receiving device is in the sleep state, the transmitting device may re-attempt message transmission after a configurable delay. In a further aspect of the disclosure, if the transmitting device determines that the receiving device is in the sleep state, the transmitting device may re-attempt message transmission upon receiving an indication of the receiving device being awake.

Figure 17:
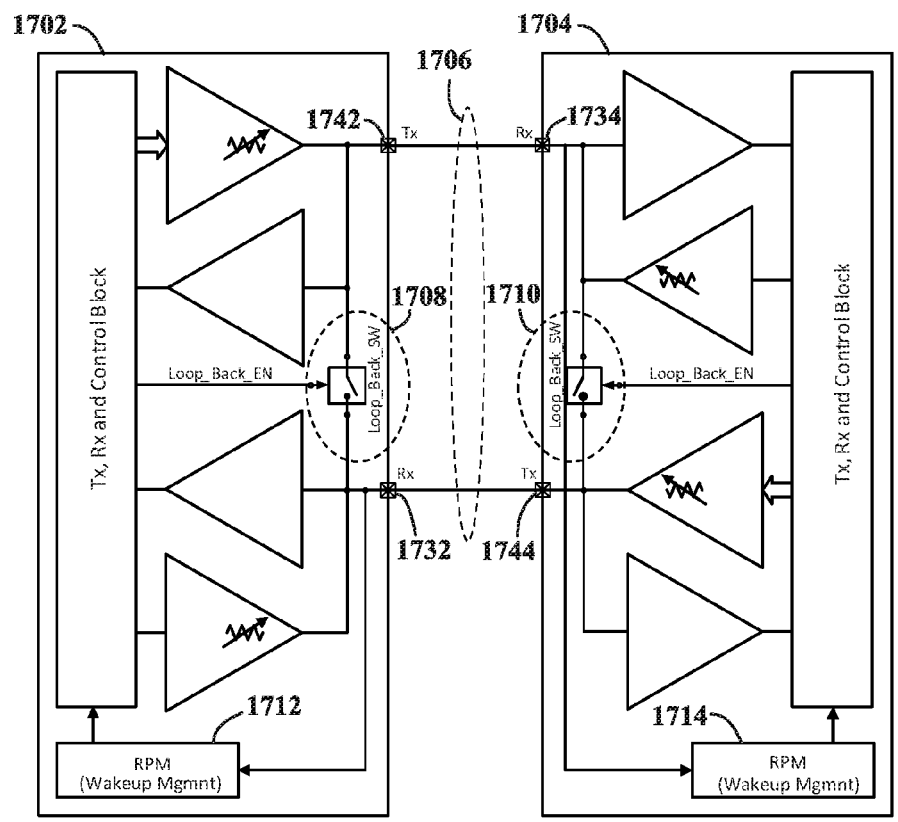
FIG. 17 is a diagram illustrating devices interconnected by a physical interface and including loopback switches in accordance with aspects of the present disclosure.
Figure 17:
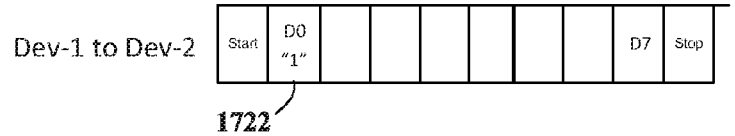
Figure 17:
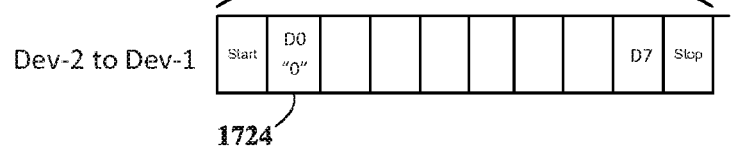

FIG. 17 is a diagram 1700 illustrating devices interconnected by a physical interface and including loopback switches in accordance with aspects of the present disclosure, in FIG. 17, a first device (Dev-1) 1702 is interconnected to a second device (Dev-2) 1704 by a physical interface (e.g., UART or other interface) 1706. Although aspects of the present disclosure are described herein with respect to a two-wire LM-UART interface, it is contemplated that such aspects may also be applied to other types of bus structures. Moreover, aspects of the present disclosure may be applied to interfaces based on differential lines, with both A/C and D/C coupling. In an aspect of the disclosure, the first device 1702 may be the host device 101 of FIG. 1 including all of the circuits/modules and functionalities associated with the host device 101. Furthermore, the second device 1704 may be the peripheral device 105 of FIG. 1 including all of the circuits/modules and functionalities associated with the peripheral device 105. The first device 1702 may further include a loopback switch 1708 and a wakeup block (RPM) 1712 for managing a wakeup operation of the first device 1702. Similarly, the second device 1704 may further include a loopback switch 1710 and a wakeup block (RPM) 1714 for managing a wakeup operation of the second device 1704.

The combination of features depicted in FIG. 17 provide a solution for overcoming power state blindness/obliviousness between the first device 1702 and the second device 1704 interconnected by the physical interface 1706. In an aspect of the disclosure, when the physical interface 1706 enters a sleep state, the loopback switch 1708 at the first device 1702 and the loopback switch 1710 at the second device 1704 are enabled.

In a further aspect of the disclosure, transmission signatures may be identified by a unique pre-assigned bit or bit sequence. For example, a bit "D0" of a sequence of bits may contain a transmission signature indicating which device is the originator of a transmitted message. The transmission signature helps a device determine if a received transmission is a valid transmission from another device or a looped-back echo of the device's own transmission. As shown in FIG. 17, when the first device 1702 transmits a message 1752 to the second device 1704 (Dev-1 to Dev-2) via a sequence of bits D0 to D7, the bit D0 at 1722 may contain a value of "1" indicating that the first device 1702 is the originator of the message. When the second device 1704 transmits a message 1754 to the first device 1702 (Dev-2 to Dev-1) via a sequence of bits D0 to D7, the bit D0 at 1724 may contain a value of "0" indicating that the second device 1704 is the originator of the message. Accordingly, if the first device 1702 receives a message, wherein the bit D0 contains a value of "0" then the first device 1702 may determine that the message is a valid transmission from the second device 1704. However, if the message received by the first device 1702 has the bit D0 containing a value of "1" then the first device 1702 may determine that the message is a looped-back echo of the first device 1702's own transmission. If the second device 1704 receives a message, wherein the bit D0 contains a value of "1" then the second device 1704 may determine that the message is a valid transmission from the first device 1702. However, if the message received by the second device 1704 has the bit D0 containing a value of "0" then the second device 1704 may determine that the message is a looped-back echo of the second device 1704's own transmission. In an aspect of the disclosure, although FIG. 17 illustrates implementing only one bit (e.g., bit D0) to indicate which device is the originator of a transmitted message, it is contemplated that in other implementations multiple (more than one) bits may be used to indicate the message originator. Such multi-bit implementation may be used in a multi-drop network scenario.

As an example, assume that the first device 1702 is in a sleep state and the second device 1704 is an active state. When the first device 1702 is in the sleep state, the loopback switch 1708 of the first device 1702 is enabled (switched ON). When the second device 1704 is in the active state, the loopback switch of the second device 1704 is disabled (switched OFF).

When the second device 1704 transmits a message to the first device 1702 (Dev-2 to Dev-1) while the first device 1702 is in the sleep state, the message will be detected at the Rx pin 1732, routed through the enabled loopback switch 1708, and returned back to the second device 1704 via the Tx pin 1742. Additionally, a line transition caused by the incoming message and detected at the Rx pin 1732 may be used by the wakeup block (RPM) 1712 to initiate a wakeup sequence at the first device 1702. For example, in one implementation, when the idle state of the physical interface 1706 is a logic HIGH (logic-1), the wakeup sequence will be initiated when the Rx pin 1732 detects a 1-to-0 line transition. In another implementation, when the idle state of the physical interface 1706 is a logic LOW (logic-0), the wakeup sequence will be initiated when the Rx pin 1732 detects a 0-to-1 line transition. Upon return of the message back to the second device 1704, the second device 1704 will examine the bit D0 for a signature. If the bit D0 contains the value of "0" then the second device 1704 will determine that the received message is an echo of its own previously transmitted message and conclude that the first device 1702 is in the sleep state.

When the first device 1702 transmits a message to the second device 1704 (Dev-1 to Dev-2) while the second device 1704 is in the sleep state, the message will be detected at the Rx pin 1734, routed through the enabled loopback switch 1710, and returned back to the first device 1702 via the Tx pin 1744. Additionally, a line transition caused by the incoming message and detected at the Rx pin 1734 may be used by the wakeup block (RPM) 1714 to initiate a wakeup sequence at the second device 1704. For example, in one implementation, when the idle state of the physical interface 1706 is a logic HIGH (logic-1), the wakeup sequence will be initiated when the Rx pin 1734 detects a 1-to-0 line transition. In another implementation, when the idle state of the physical interface 1706 is a logic LOW (logic-0), the wakeup sequence will be initiated when the Rx pin 1734 detects a 0-to-1 line transition. Upon return of the message back to the first device 1702, the first device 1702 will examine the bit D0 for a signature. If the bit D0 contains the value of "1" then the first device 1702 will determine that the received message is an echo of its own previously transmitted message and conclude that the second device 1704 is in the sleep state.

Figure 18:
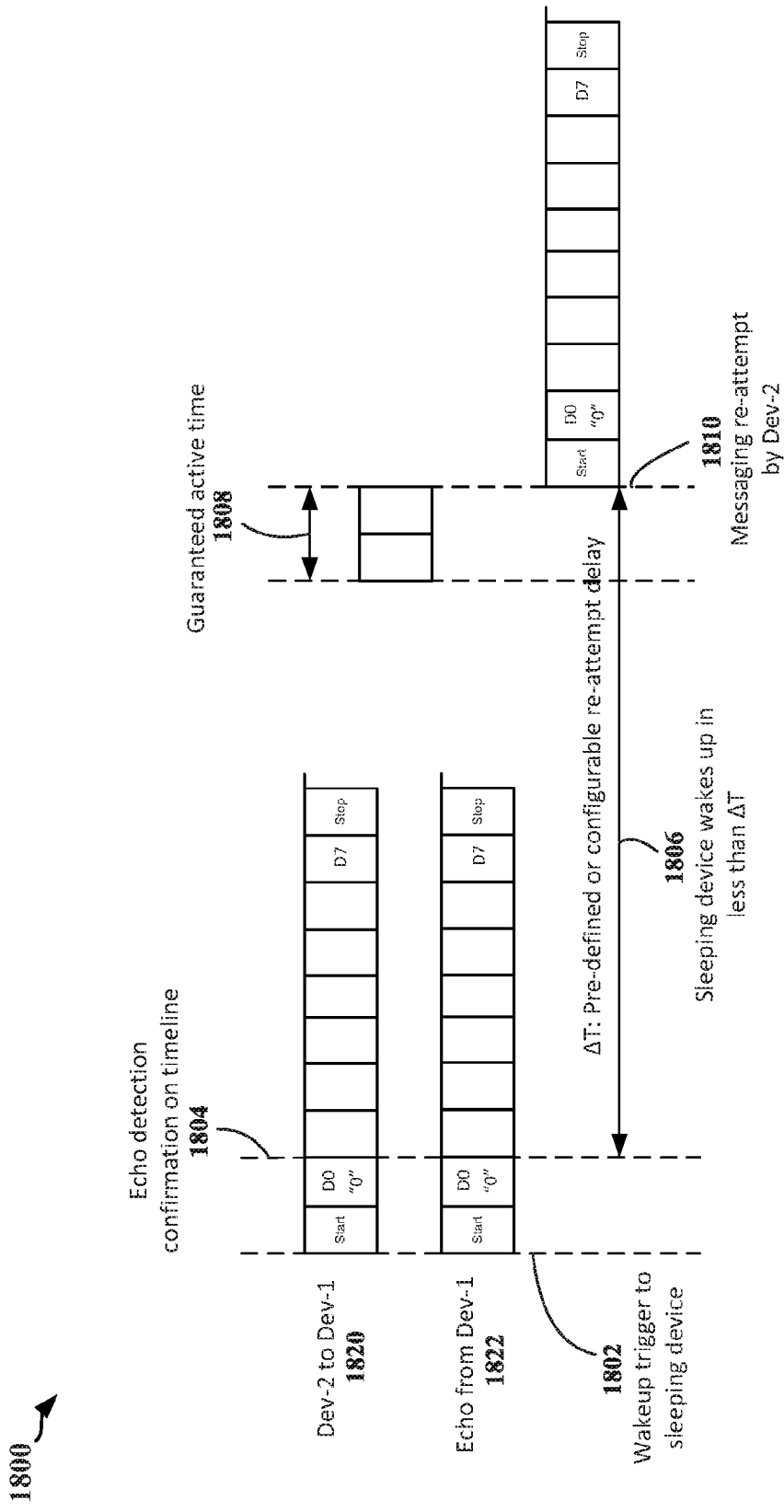
FIG. 18 is a diagram illustrating wakeup of a first device and a transmission re-attempt from a second device based on a fixed delay according to aspects of the present disclosure.

FIG. 18 is a diagram 1800 illustrating wakeup of a first device and a transmission re-attempt from a second device based on a fixed delay according to aspects of the present disclosure. When the second device (Dev-2) transmits a message to the first device (Dev-1) 1820 while the first device is in the sleep state, the message detected at the sleeping first device will trigger a wakeup block (RPM) at the first device to perform a wakeup sequence 1802. Meanwhile, the message detected at the sleeping first device is returned back to the second device. Upon return of the message back to the second device, the second device examines the bit D0 for a signature and may confirm that the message is a looped-back echo 1822 of its own transmission and that the first device is in the sleep state when the bit D0 contains a value of "0" 1804. The wakeup sequence performed by the second device is completed in less than a time ΔT 1806. The time ΔT may be pre-defined or a configurable transmission re-attempt delay. In an aspect of the disclosure, the wakeup sequence at the first device may begin an amount of time (e.g., a length of two bits) before the second device confirms the looped-back echo. Accordingly, the first device may have a guaranteed active time 1808 (e.g., a length of two bits) before the second device may re-attempt transmission. When the time ΔT has elapsed (i.e., after the guaranteed active time of the first device), the second device may re-attempt transmission of the message to the first device 1810. Thus, any packets that may have been lost during the original transmission of the message when the first device was asleep are now re-transmitted while the first device is known to be awake.

Figure 19:
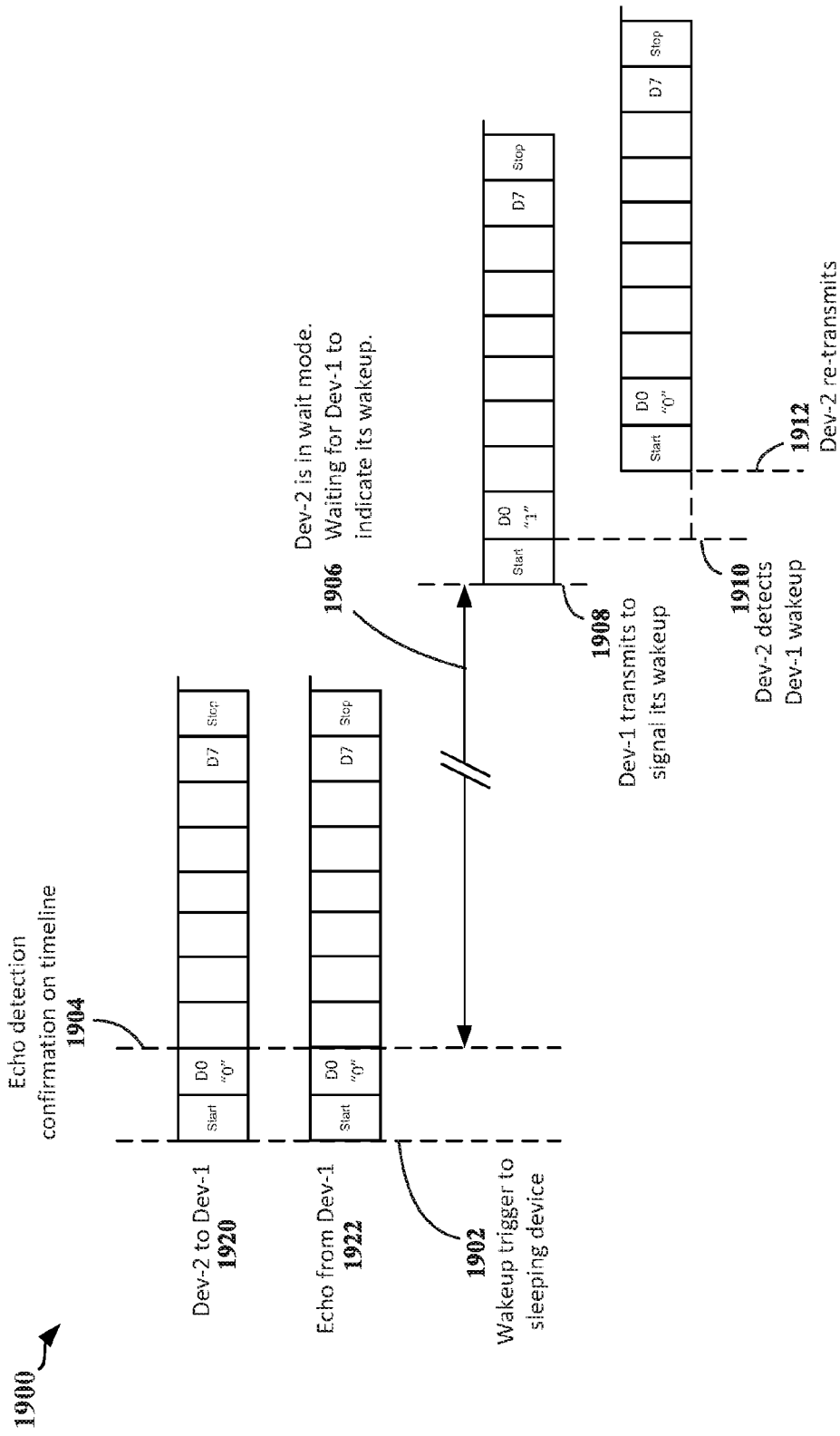
FIG. 19 is a diagram illustrating wakeup of a first device and a transmission re-attempt from a second device based on a wakeup indication according to aspects of the present disclosure.

FIG. 19 is a diagram 1900 illustrating wakeup of a first device and a transmission re-attempt from a second device based on a wakeup indication according to aspects of the present disclosure. When the second device (Device-2) transmits a message to the first device (Device-1) 1920 while the first device is in the sleep state, the message detected at the sleeping first device will trigger a wakeup block (RPM) at the first device to perform a wakeup sequence 1902. Meanwhile, the message detected at the sleeping first device is returned back to the second device. Upon return of the message back to the second device, the second device examines the bit D0 for a signature and may confirm that the message is a looped-back echo 1922 of its own transmission and that the first device is in the sleep state when the bit D0 contains a value of "0" 1904. After determining that the first device is in the sleep state, the second device enters a wait mode 1906, wherein the second device waits for the first device to indicate a wakeup. A maximum length of the wait mode may be configurable. When the first device completes the wakeup sequence and is awake, the first device may transmit a signal to the second device to indicate the wakeup 1908. In an aspect of the disclosure, an indication delay for transmitting the wakeup indication signal after the first device wakes up may be configured for optimal latency. For example, the indication delay may be configured between a host device and a peripheral device such that the host device has the final say on the length of the indication delay. Once the wakeup indication from the first device is detected by the second device 1910, the second device may re-attempt transmission of the message to the first device 1912. Thus, any packets that may have been lost during the original transmission of the message when the first device was asleep are now re-transmitted while the first device is known to be awake.

According to aspects of the disclosure, although the operations regarding FIGS. 18 and 19 are described above with respect to a second device transmitting a message to a sleeping first device, it is contemplated that the same principles apply to a scenario when the first device transmits a message to the second device while the second device is in the sleep state.

Figure 20:
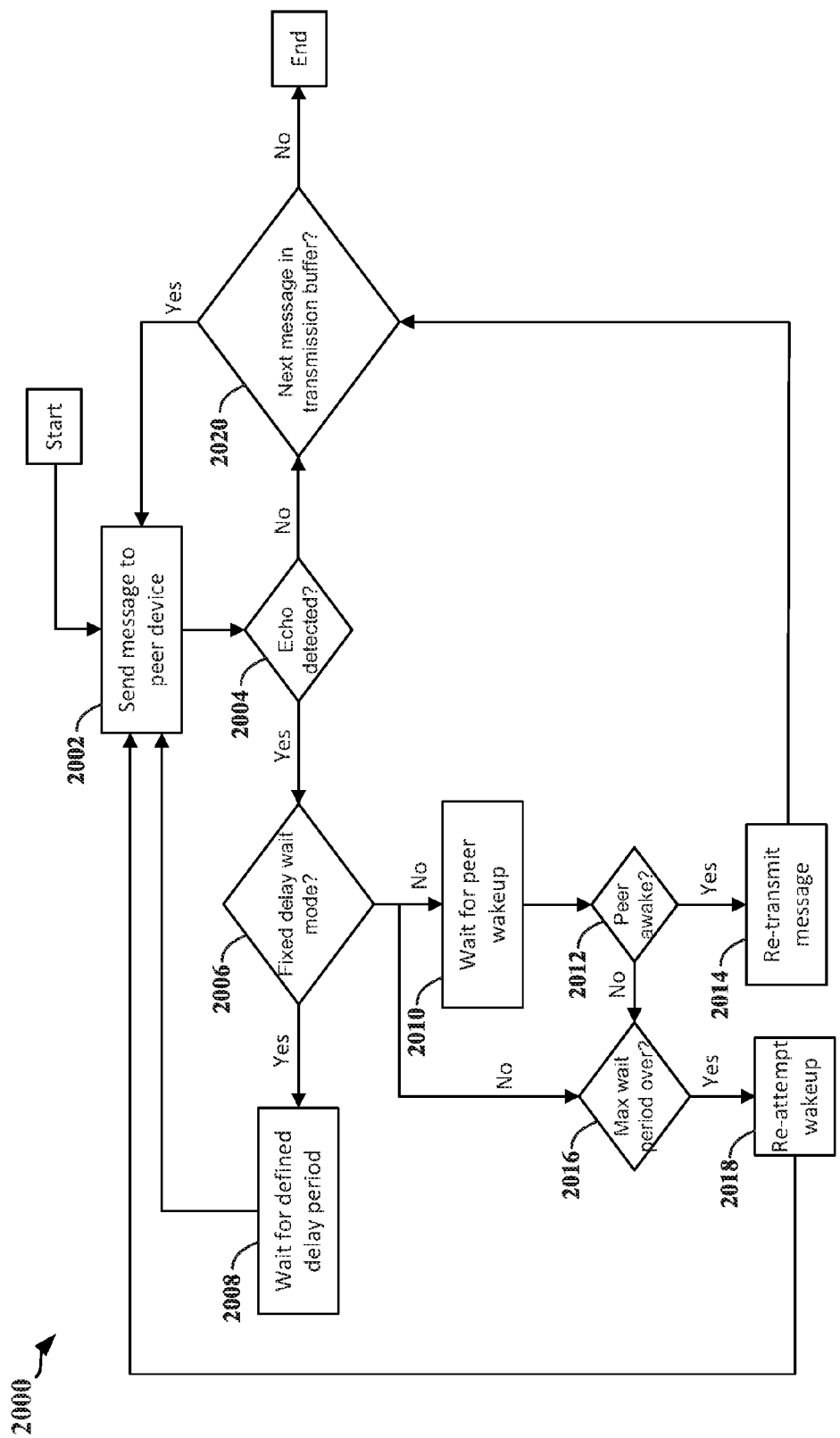
FIG. 20 is a diagram of a method of communicating a signal to a peer device based on a determined power state of the peer device according to one or more aspects of the disclosure.

FIG. 20 is a diagram 2000 of a method of transmitting a signal to a peer device based on a determined power state of the peer device. The method may be performed by an apparatus (e.g., host device 101 or peripheral device 105 of FIG. 1, apparatus 1400 of FIG. 14, first device 1702 or second device 1704 of FIG. 17, or apparatus 2100 of FIG. 21).

The apparatus transmits a message to a peer device 2002. Thereafter, the apparatus receives a message and checks a message signature to determine whether the received message is a valid transmission from the peer device or a loopback echo of the apparatus's previous transmission 2004. If the received message is not the loopback echo, the apparatus determines if a next message exists in a transmission buffer 2020 and sends the next message to the peer device 2002.

If the received message is the loopback echo, the apparatus will perform a message retransmission according to one of two modes: 1) a fixed delay wait mode; or 2) a wakeup indication mode. When the apparatus operates under the fixed delay wait mode 2006, the apparatus waits for a defined delay period 2008 prior to retransmitting the message to the peer device 2002. When the apparatus does not operate under the fixed delay wait mode 2006, the apparatus operates under the wakeup indication mode and waits to receive an indication from the peer device that the peer device is awake 2010. When the apparatus receives the indication that the peer device is awake 2012, the apparatus retransmits the message to the peer device 2014. Alternatively, if the apparatus does not receive the wakeup indication from the peer device and/or if a maximum period for waiting to receive the wakeup indication has elapsed 2016, the apparatus reattempts a wakeup of the peer device 2018 and retransmits the message to the peer device 2002.

Figure 21:
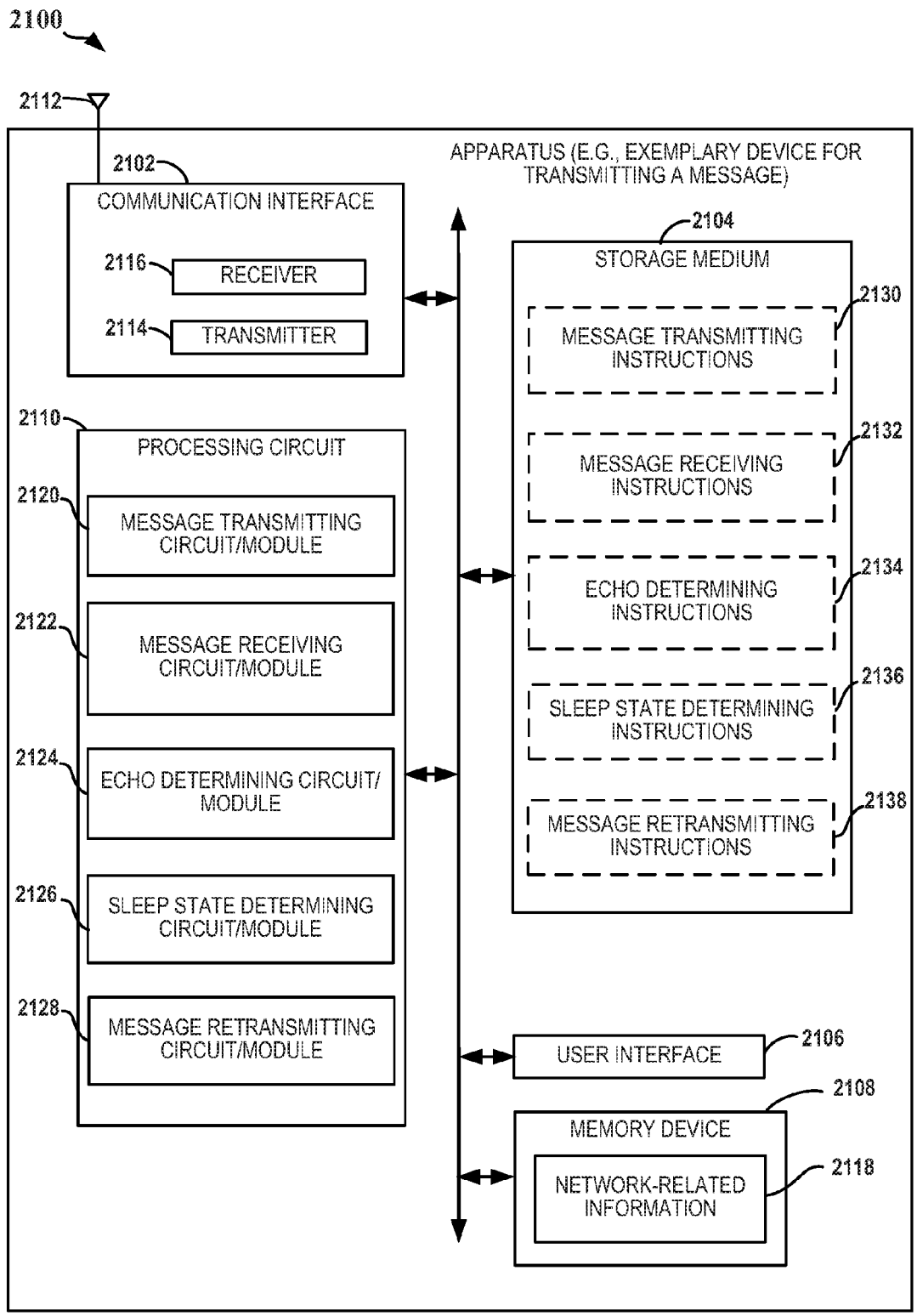
FIG. 21 is an illustration of an apparatus configured to support operations related to transmitting a signal/packet/message to a device based on a determined power state according to one or more aspects of the disclosure.
Figure 22:
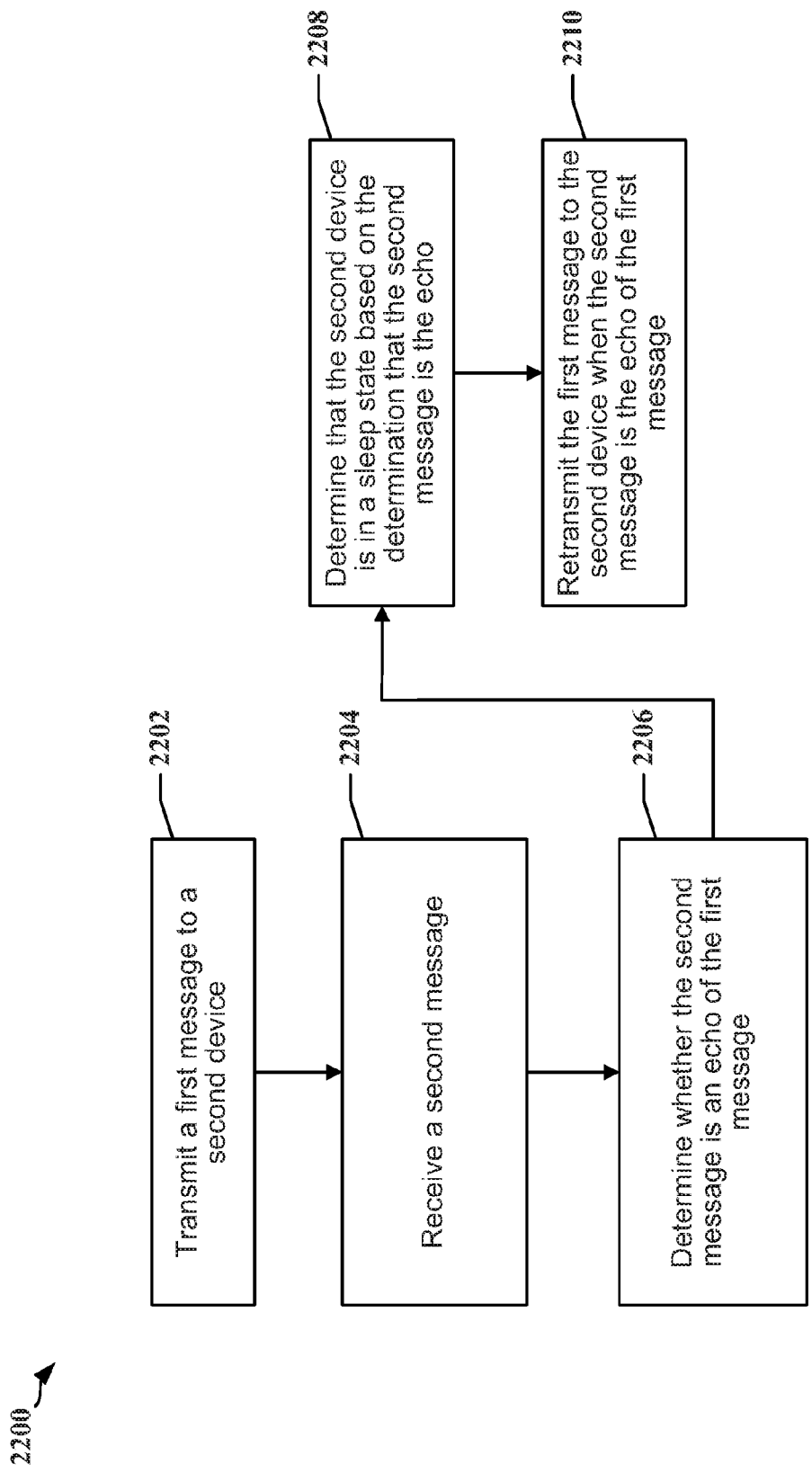
FIG. 22 is a flowchart illustrating a method of a first device for transmitting a signal/packet/message to a second device based on a determined power state of the second device according to one or more aspects of the disclosure.

Exemplary Device and Method for Transmitting a Signal to a Device Based on a Determined Power State FIG. 21 is an illustration of an apparatus 2100 configured to support operations related to transmitting a signal/packet/message to a device based on a determined power state according to one or more aspects of the disclosure (e.g., aspects related to the methods of FIGS. 20 and 22). The apparatus 2100 includes a communication interface (e.g., at least one transceiver) 2102, a storage medium 2104, a user interface 2106, a memory device 2108, and a processing circuit 2110.

These components can be coupled to and/or placed in electrical communication with one another via a signaling bus or other suitable component, represented generally by the connection lines in FIG. 21. The signaling bus may include any number of interconnecting buses and bridges depending on the specific application of the processing circuit 2110 and the overall design constraints. The signaling bus links together various circuits such that each of the communication interface 2102, the storage medium 2104, the user interface 2106, and the memory device 2108 are coupled to and/or in electrical communication with the processing circuit 2110. The signaling bus may also link various other circuits (not shown) such as timing sources, peripherals, voltage regulators, and power management circuits, which are well known in the art, and therefore, will not be described any further.

The communication interface 2102 may be adapted to facilitate wireless communication of the apparatus 2100. For example, the communication interface 2102 may include circuitry and/or code (e.g., instructions) adapted to facilitate the communication of information bi-directionally with respect to one or more communication devices in a network. The communication interface 2102 may be coupled to one or more antennas 2112 for wireless communication within a wireless communication system. The communication interface 2102 can be configured with one or more standalone receivers and/or transmitters, as well as one or more transceivers. In the illustrated example, the communication interface 2102 includes a transmitter 2114 and a receiver 2116.

The memory device 2108 may represent one or more memory devices. As indicated, the memory device 2108 may maintain network-related information 2118 along with other information used by the apparatus 2100. In some implementations, the memory device 2108 and the storage medium 2104 are implemented as a common memory component. The memory device 2108 may also be used for storing data that is manipulated by the processing circuit 2110 or some other component of the apparatus 2100.

The storage medium 2104 may represent one or more computer-readable, machine-readable, and/or processor-readable devices for storing code, such as processor executable code or instructions (e.g., software, firmware), electronic data, databases, or other digital information. The storage medium 2104 may also be used for storing data that is manipulated by the processing circuit 2110 when executing code. The storage medium 2104 may be any available media that can be accessed by a general purpose or special purpose processor, including portable or fixed storage devices, optical storage devices, and various other mediums capable of storing, containing or carrying code.

By way of example and not limitation, the storage medium 2104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2104 may be embodied in an article of manufacture (e.g., a computer program product). By way of example, a computer program product may include a computer-readable medium in packaging materials. In view of the above, in some implementations, the storage medium 2104 may be a non-transitory (e.g., tangible) storage medium.

The storage medium 2104 may be coupled to the processing circuit 2110 such that the processing circuit 2110 can read information from, and write information to, storage medium 2104. That is, the storage medium 2104 can be coupled to the processing circuit 2110 so that the storage medium 2104 is at least accessible by the processing circuit 2110, including examples where at least one storage medium is integral to the processing circuit 2110 and/or examples where at least one storage medium is separate from the processing circuit 2110 (e.g., resident in the apparatus 2100, external to the apparatus 2100, distributed across multiple entities, etc.).

Code and/or instructions stored by the storage medium 2104, when executed by the processing circuit 2110, causes the processing circuit 2110 to perform one or more of the various functions and/or process operations described herein. For example, the storage medium 2104 may include operations configured for regulating operations at one or more hardware blocks of the processing circuit 2110, as well as to utilize the communication interface 2102 for wireless communication utilizing their respective communication protocols.

The processing circuit 2110 is generally adapted for processing, including the execution of such code/instructions stored on the storage medium 2104. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2110 is arranged to obtain, process and/or send data, control data access and storage, issue commands, and control other desired operations. The processing circuit 2110 may include circuitry configured to implement desired code provided by appropriate media in at least one example. For example, the processing circuit 2110 may be implemented as one or more processors, one or more controllers, and/or other structure configured to execute executable code. Examples of the processing circuit 2110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2110 are for illustration and other suitable configurations within the scope of the disclosure are also contemplated.

According to one or more aspects of the disclosure, the processing circuit 2110 may be adapted to perform any or all of the features, processes, functions, operations and/or routines for any or all of the apparatuses described herein. As used herein, the term "adapted" in relation to the processing circuit 2110 may refer to the processing circuit 2110 being one or more of configured, employed, implemented, and/or programmed to perform a particular process, function, operation and/or routine according to various features described herein.

According to at least one example of the apparatus 2100, the processing circuit 2110 may include one or more of a message transmitting circuit/module 2120, a message receiving circuit/module 2122, an echo determining circuit/module 2124, a sleep state determining circuit/module 2126, and a message retransmitting circuit/module 2128, that are adapted to perform any or all of the features, processes, functions, operations and/or routines described herein (e.g., features, processes, functions, operations and/or routines described with respect to FIG. 20 and/or FIG. 22).

The message transmitting circuit/module 2120 may include circuitry and/or instructions (e.g., message transmitting instructions 2130 stored on the storage medium 2104) adapted to perform several functions relating to, for example, transmitting a first message to a second device.

The message receiving circuit/module 2122 may include circuitry and/or instructions (e.g., message receiving instructions 2132 stored on the storage medium 2104) adapted to perform several functions relating to, for example, receiving a second message.

The echo determining circuit/module 2124 may include circuitry and/or instructions (e.g., echo determining instructions 2134 stored on the storage medium 2104) adapted to perform several functions relating to, for example, determining whether the second message is an echo of the first message.

The sleep state determining circuit/module 2126 may include circuitry and/or instructions (e.g., sleep state determining instructions 2136 stored on the storage medium 2104) adapted to perform several functions relating to, for example, determining that the second device is in a sleep state based on the determination that the second message is the echo.

The message retransmitting circuit/module 2128 may further include circuitry and/or instructions (e.g., message retransmitting instructions 2138 stored on the storage medium 2104) adapted to perform several functions relating to, for example, retransmitting the first message to the second device when the second message is the echo of the first message.

As mentioned above, instructions stored by the storage medium 2104, when executed by the processing circuit 2110, causes the processing circuit 2110 to perform one or more of the various functions and/or process operations described herein. For example, the storage medium 2104 may include one or more of the message transmitting instructions 2130, the message receiving instructions 2132, the echo determining instructions 2134, the sleep state determining instructions 2136, and the message retransmitting instructions 2138.

FIG. 22 is a flowchart 2200 illustrating a method of transmitting a signal/packet/message to a second device based on a determined power state of the second device. The method may be performed by a first device (e.g., host device 101 or peripheral device 105 of FIG. 1, apparatus 1400 of FIG. 14, device 1702 or device 1704 of FIG. 17, or apparatus 2100 of FIG. 21).

The first device transmits a first message to a second device 2202, in an aspect of the disclosure, the transmission of the first message to the second device triggers a wakeup operation at the second device. Thereafter, the first device receives a second message 2204.

The first device determines whether the second message is an echo of the first message 2206. Determining whether the second message is the echo of the first message may include identifying a bit of the second message indicating an originator of the second message. When the bit indicates that the first device is the originator of the second message, then the first device determines that the second message is the echo. Accordingly, the first device further determines that the second device is in a sleep state when the second message is the echo 2208. When the bit indicates that the second device is the originator of the second message, then the first device determines that the second message is not the echo and the second device is in an active state.

The first device retransmits the first message to the second device when the second message is the echo of the first message 2210. In an aspect of the disclosure, retransmitting the first message includes waiting a pre-defined amount of time for the second device to wake up after determining that the second message is the echo, and retransmitting the first message to the second device after the pre-defined amount of time has elapsed. In another aspect of the disclosure, retransmitting the first message includes waiting to receive a wakeup indication from the second device after determining that the second message is the echo, and retransmitting the first message to the second device after receiving the wakeup indication. Moreover, if the wakeup indication is not received by the first device after a maximum wait time has elapsed, then the first device may proceed with retransmitting the first message to the second device.

Exemplary Device and Method for Detecting a Signal During a Sleep State

Figure 23:
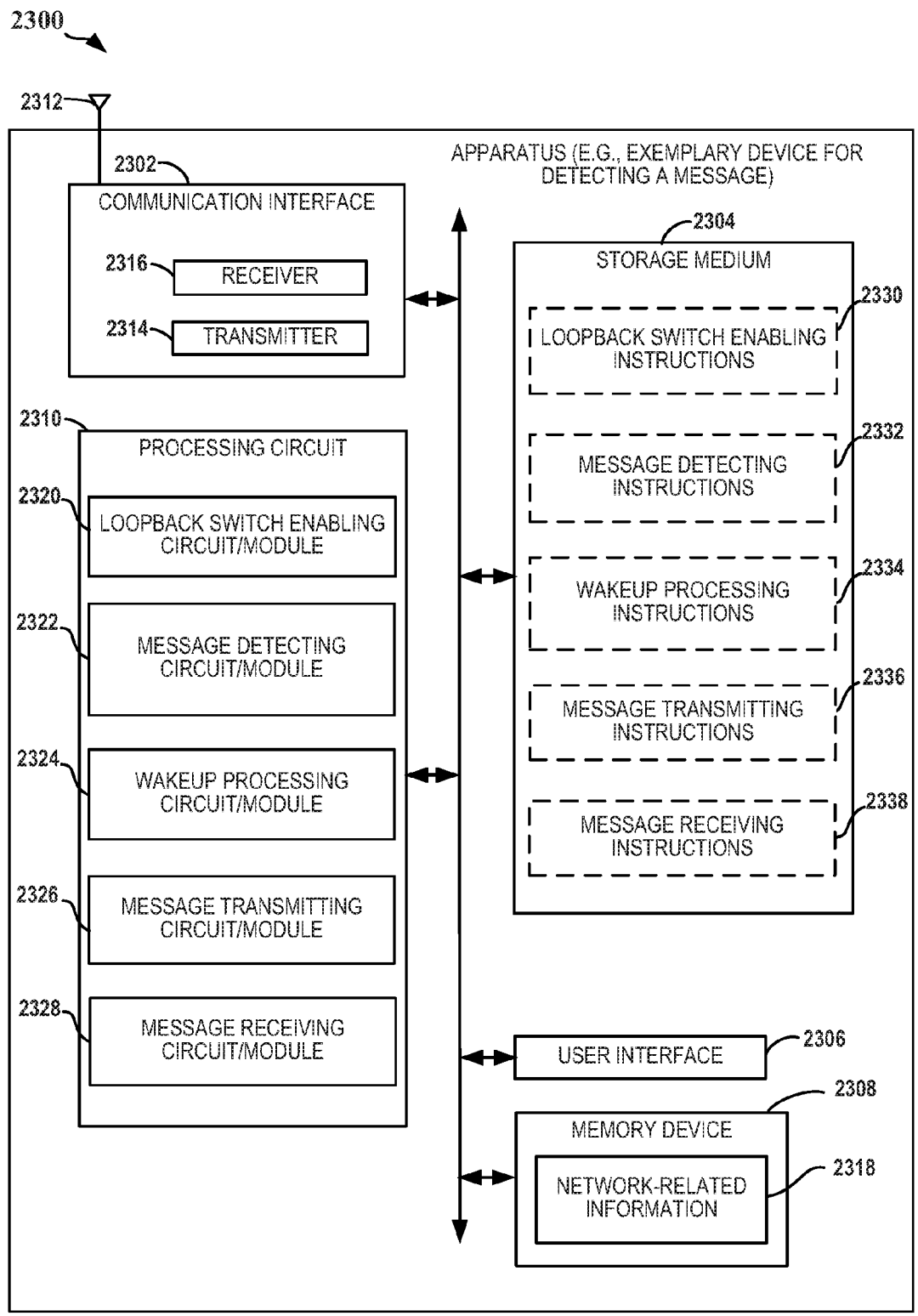
FIG. 23 is an illustration of an apparatus configured to support operations related to detecting a signal/packet/message during a sleep state according to one or more aspects of the disclosure.
Figure 24:
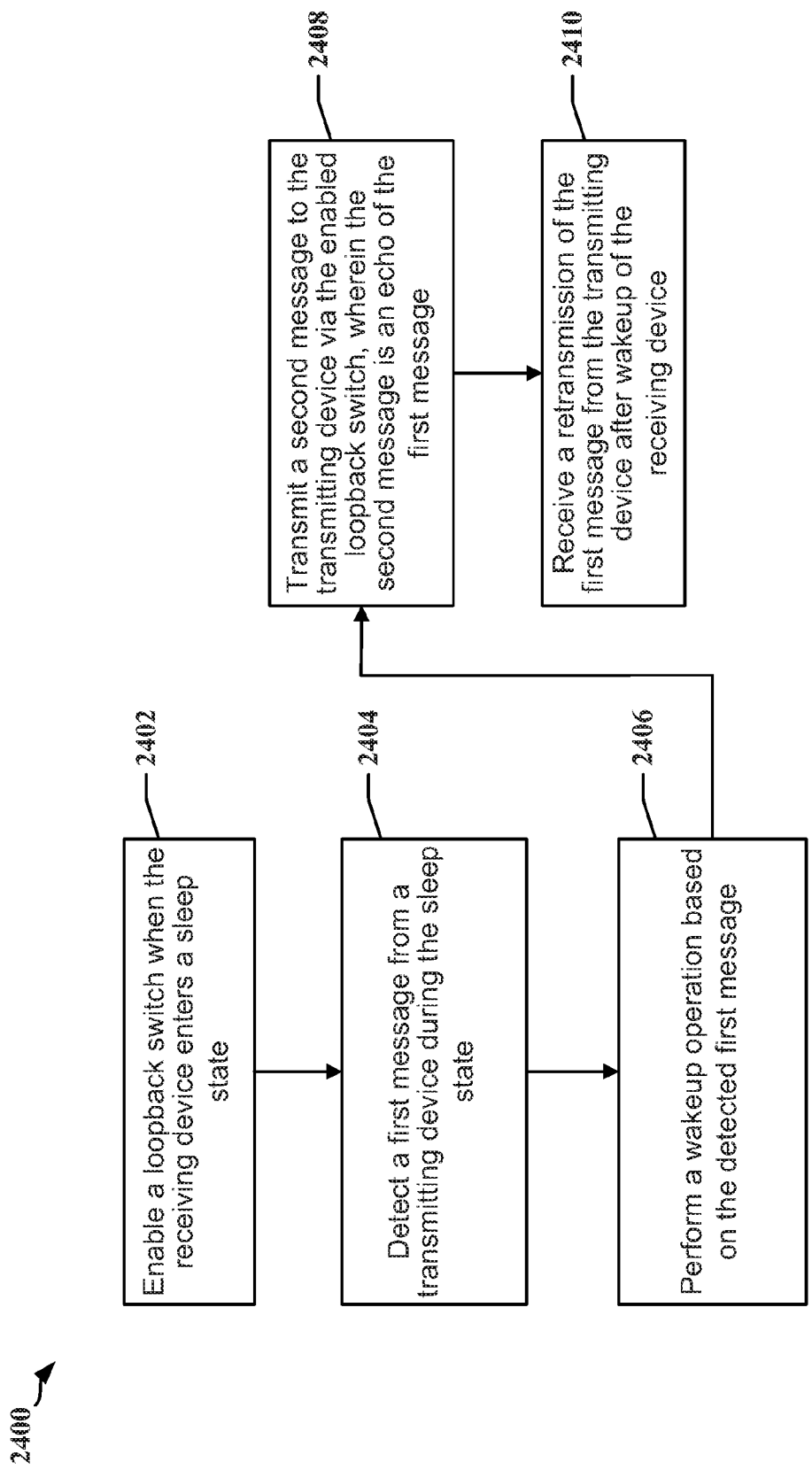
FIG. 24 is a flowchart illustrating a method of a receiving device for detecting a signal/packet/message from a transmitting device during a sleep state of the receiving device according to one or more aspects of the disclosure.

FIG. 23 is an illustration of an apparatus 2300 configured to support operations related to detecting a signal/packet/message during a sleep state according to one or more aspects of the disclosure e.g., aspects related to the methods of FIGS. 20 and 24). The apparatus 2300 includes a communication interface (e.g., at least one transceiver) 2302, a storage medium 2304, a user interface 2306, a memory device 2308, and a processing circuit 2310.

These components can be coupled to and/or placed in electrical communication with one another via a signaling bus or other suitable component, represented generally by the connection lines in FIG. 23. The signaling bus may include any number of interconnecting buses and bridges depending on the specific application of the processing circuit 2310 and the overall design constraints. The signaling bus links together various circuits such that each of the communication interface 2302, the storage medium 2304, the user interface 2306, and the memory device 2308 are coupled to and/or in electrical communication with the processing circuit 2310. The signaling bus may also link various other circuits (not shown) such as timing sources, peripherals, voltage regulators, and power management circuits, which are well known in the art, and therefore, will not be described any further.

The communication interface 2302 may be adapted to facilitate wireless communication of the apparatus 2300. For example, the communication interface 2302 may include circuitry and/or code (e.g., instructions) adapted to facilitate the communication of information bi-directionally with respect to one or more communication devices in a network. The communication interface 2302 may be coupled to one or more antennas 2312 for wireless communication within a wireless communication system. The communication interface 2302 can be configured with one or more standalone receivers and/or transmitters, as well as one or more transceivers. In the illustrated example, the communication interface 2302 includes a transmitter 2314 and a receiver 2316.

The memory device 2308 may represent one or more memory devices. As indicated, the memory device 2308 may maintain network-related information 2318 along with other information used by the apparatus 2300. In some implementations, the memory device 2308 and the storage medium 2304 are implemented as a common memory component. The memory device 2308 may also be used for storing data that is manipulated by the processing circuit 2310 or some other component of the apparatus 2300.

The storage medium 2304 may represent one or more computer-readable, machine-readable, and/or processor-readable devices for storing code, such as processor executable code or instructions (e.g., software, firmware), electronic data, databases, or other digital information. The storage medium 2304 may also be used for storing data that is manipulated by the processing circuit 2310 when executing code. The storage medium 2304 may be any available media that can be accessed by a general purpose or special purpose processor, including portable or fixed storage devices, optical storage devices, and various other mediums capable of storing, containing or carrying code.

By way of example and not limitation, the storage medium 2304 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2304 may be embodied in an article of manufacture e.g., a computer program product). By way of example, a computer program product may include a computer-readable medium in packaging materials. In view of the above, in some implementations, the storage medium 2304 may be a non-transitory (e.g., tangible) storage medium.

The storage medium 2304 may be coupled to the processing circuit 2310 such that the processing circuit 2310 can read information from, and write information to, the storage medium 2304. That is, the storage medium 2304 can be coupled to the processing circuit 2310 so that the storage medium 2304 is at least accessible by the processing circuit 2310, including examples where at least one storage medium is integral to the processing circuit 2310 and/or examples where at least one storage medium is separate from the processing circuit 2310 (e.g., resident in the apparatus 2300, external to the apparatus 2300, distributed across multiple entities, etc.).

Code and/or instructions stored by the storage medium 2304, when executed by the processing circuit 2310, causes the processing circuit 2310 to perform one or more of the various functions and/or process operations described herein. For example, the storage medium 2304 may include operations configured for regulating operations at one or more hardware blocks of the processing circuit 2310, as well as to utilize the communication interface 2302 for wireless communication utilizing their respective communication protocols.

The processing circuit 2310 is generally adapted for processing, including the execution of such code/instructions stored on the storage medium 2304. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2310 is arranged to obtain, process and/or send data, control data access and storage, issue commands, and control other desired operations. The processing circuit 2310 may include circuitry configured to implement desired code provided by appropriate media in at least one example. For example, the processing circuit 2310 may be implemented as one or more processors, one or more controllers, and/or other structure configured to execute executable code. Examples of the processing circuit 2310 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2310 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2310 are for illustration and other suitable configurations within the scope of the disclosure are also contemplated.

According to one or more aspects of the disclosure, the processing circuit 2310 may be adapted to perform any or all of the features, processes, functions, operations and/or routines for any or all of the apparatuses described herein. As used herein, the term "adapted" in relation to the processing circuit 2310 may refer to the processing circuit 2310 being one or more of configured, employed, implemented, and/or programmed to perform a particular process, function, operation and/or routine according to various features described herein.

According to at least one example of the apparatus 2300, the processing circuit 2310 may include one or more of a loopback switch enabling circuit/module 2320, a message detecting circuit/module 2322, a wakeup processing circuit/module 2324, a message transmitting circuit/module 2326, and a message receiving circuit/module 2328, that are adapted to perform any or all of the features, processes, functions, operations and/or routines described herein (e.g., features, processes, functions, operations and/or routines described with respect to FIG. 20 and/or FIG. 24).

The loopback switch enabling circuit/module 2320 may include circuitry and/or instructions (e.g., loopback switch enabling instructions 2330 stored on the storage medium 2304) adapted to perform several functions relating to, for example, enabling a loopback switch when the receiving device enters a sleep state.

The message detecting circuit/module 2322 may include circuitry and/or instructions (e.g., message detecting instructions 2332 stored on the storage medium 2304) adapted to perform several functions relating to, for example, detecting a first message from a transmitting device during asleep state.

The wakeup processing circuit/module 2324 may include circuitry and/or instructions (e.g., wakeup processing instructions 2334 stored on the storage medium 2304) adapted to perform several functions relating to, for example, performing a wakeup operation based on the detected first message.

The message transmitting circuit/module 2326 may include circuitry and/or instructions (e.g., message transmitting instructions 2336 stored on the storage medium 2304) adapted to perform several functions relating to, for example, transmitting a second message to the transmitting device via the enabled loopback switch, wherein the second message is an echo of the first message.

The message receiving circuit/module 2328 may further include circuitry and/or instructions (e.g., message receiving instructions 2338 stored on the storage medium 2304) adapted to perform several functions relating to, for example, receiving a retransmission of the first message from the transmitting device after wakeup of the receiving device.

As mentioned above, instructions stored by the storage medium 2304, when executed by the processing circuit 2310, causes the processing circuit 2310 to perform one or more of the various functions and/or process operations described herein. For example, the storage medium 2304 may include one or more of the loopback switch enabling instructions 2330, the message detecting instructions 2332, the wakeup processing instructions 2334, the message transmitting instructions 2336, and the message receiving instructions 2338.

FIG. 24 is a flowchart 2400 illustrating a method of detecting a signal/packet/message from a transmitting device during a sleep state. The method may be performed by a receiving device (e.g., host device 101 or peripheral device 105 of FIG. 1, apparatus 1400 of FIG. 14, device 1702 or device 1704 of FIG. 17, or apparatus 2300 of FIG. 23).

The receiving device enables a loopback switch when the receiving device enters a sleep state 2402. Thereafter, the receiving device detects a first message from the transmitting device during the sleep state 2404 and proceeds to perform a wakeup operation based on the detected first message 2406.

The receiving device then transmits a second message to the transmitting device via the enabled loopback switch, wherein the second message is an echo of the first message 2408. In an aspect of the disclosure, the receiving device transmits the second message as the echo of the first message to indicate that the receiving device is in the sleep state. The second message may include a bit indicating the transmitting device as the originator of the second message.

The receiving device further receives a retransmission of the first message from the transmitting device after wakeup of the receiving device 2410. In an aspect of the disclosure, the wakeup operation includes the receiving device waking up within a pre-defined amount of time after the second message is transmitted. Accordingly, the receiving device may receive the retransmission of the first message after the pre-defined amount of time has elapsed. In another aspect of the disclosure, the wakeup operation includes the receiving device transmitting a wakeup indication to the transmitting device after wakeup of the receiving device. Accordingly, the receiving device receives the retransmission of the first message after the wakeup indication is transmitted.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or," That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more," Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A first device for transmitting a message, comprising:
a memory; and
a processing circuit coupled to the memory and configured to:
  transmit a first message to a second device,
  receive a second message,
  determine whether the second message is an echo of the first message,
  determine that the second device is in a sleep state based on the determination that the second message is the echo, and
  retransmit the first message to the second device when the second message is the echo of the first message and the second device is known to be awake.

2. The first device of claim 1, wherein the processing circuit is configured to determine whether the second message is the echo of the first message by:
  identifying a bit of the second message indicating an originator of the second message;
  determining that the second message is the echo when the bit indicates the first device as the originator of the second message; and
  determining that the second message is not the echo when the bit indicates the second device as the originator of the second message.

3. The first device of claim 1, wherein the processing circuit is configured to retransmit the first message by:
  waiting a pre-defined amount of time for the second device to wake up after determining that the second message is the echo; and
  retransmitting the first message to the second device after the pre-defined amount of time has elapsed.

4. The first device of claim 1, wherein the processing circuit is configured to retransmit the first message by:
  waiting to receive a wakeup indication from the second device after determining that the second message is the echo; and
  retransmitting the first message to the second device after receiving the wakeup indication.

5. The first device of claim 4, wherein the processing circuit is configured to retransmit the first message by retransmitting the first message to the second device when the wakeup indication is not received after a maximum wait time has elapsed.

6. The first device of claim 1, wherein the transmission of the first message to the second device triggers a wakeup operation at the second device.

7. A method of a first device for transmitting a message, comprising:
  transmitting a first message to a second device;
  receiving a second message;
  determining whether the second message is an echo of the first message;
  determining that the second device is in a sleep state based on the determination that the second message is the echo; and
  retransmitting the first message to the second device when the second message is the echo of the first message and the second device is known to be awake.

8. The method of claim 7, wherein the determining whether the second message is the echo of the first message includes:
  identifying a bit of the second message indicating an originator of the second message;

determining that the second message is the echo when the bit indicates the first device as the originator of the second message; and determining that the second message is not the echo when the bit indicates the second device as the originator of the second message.

9. The method of claim 7, wherein the retransmitting the first message includes:

waiting a pre-defined amount of time for the second device to wake up after determining that the second message is the echo; and retransmitting the first message to the second device after the pre-defined amount of time has elapsed.

10. The method of claim 7, wherein the retransmitting the first message includes:

waiting to receive a wakeup indication from the second device after determining that the second message is the echo; and retransmitting the first message to the second device after receiving the wakeup indication.

11. The method of claim 10, wherein the retransmitting the first message further includes retransmitting the first message to the second device when the wakeup indication is not received after a maximum wait time has elapsed.

12. The method of claim 7, wherein the transmission of the first message to the second device triggers a wakeup operation at the second device.

13. A first device for transmitting a message, comprising:

means for transmitting a first message to a second device;

means for receiving a second message;

means for determining whether the second message is an echo of the first message;

means for determining that the second device is in a sleep state based on the determination that the second message is the echo; and means for retransmitting the first message to the second device when the second message is the echo of the first message and the second device is known to be awake.

14. The first device of claim 13, wherein the means for determining whether the second message is the echo of the first message is configured to:

identify a bit of the second message indicating an originator of the second message;

determine that the second message is the echo when the bit indicates the first device as the originator of the second message; and determine that the second message is not the echo when the bit indicates the second device as the originator of the second message.

15. The first device of claim 13, wherein the means for retransmitting the first message is configured to:

wait a pre-defined amount of time for the second device to wake up after determining that the second message is the echo; and retransmit the first message to the second device after the pre-defined amount of time has elapsed.

16. The first device of claim 13, wherein the means for retransmitting the first message is configured to:

wait to receive a wakeup indication from the second device after determining that the second message is the echo; and retransmit the first message to the second device after receiving the wakeup indication.

17. The first device of claim 16, wherein the means for retransmitting the first message further is configured to retransmit the first message to the second device when the wakeup indication is not received after a maximum wait time has elapsed.

18. The first device of claim 13, wherein the transmission of the first message to the second device triggers a wakeup operation at the second device.

19. A receiving device for detecting a message during a sleep state, comprising:

a memory; and a processing circuit coupled to the memory and configured to:

enable a loopback switch when the receiving device enters a sleep state, detect a first message from a transmitting device during the sleep state, perform a wakeup operation based on the detected first message, transmit a second message to the transmitting device via the enabled loopback switch, wherein the second message is an echo of the first message, and receive a retransmission of the first message from the transmitting device after wakeup of the receiving device.

20. The receiving device of claim 19, wherein the second message includes a bit indicating the transmitting device as an originator of the second message.

21. The receiving device of claim 19, wherein the processing circuit transmits the second message as the echo of the first message to indicate that the receiving device is in the sleep state.

22. The receiving device of claim 19, wherein the wakeup operation includes waking up the receiving device within a pre-defined amount of time after the second message is transmitted.

23. The receiving device of claim 22, wherein the processing circuit is configured to receive the retransmission of the first message after the pre-defined amount of time has elapsed.

24. The receiving device of claim 22, wherein the wakeup operation includes transmitting a wakeup indication to the transmitting device after wakeup of the receiving device.

25. The receiving device of claim 24, wherein the processing circuit is configured to receive the retransmission of the first message after the wakeup indication is transmitted.

* * * * *